United States Patent
Bazan et al.

(10) Patent No.: US 7,144,950 B2
(45) Date of Patent: Dec. 5, 2006

(54) CONFORMATIONALLY FLEXIBLE CATIONIC CONJUGATED POLYMERS

(75) Inventors: Guillermo C. Bazan, Santa Barbara, CA (US); Bin Liu, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/666,333

(22) Filed: Sep. 17, 2003

(65) Prior Publication Data

US 2005/0059168 A1    Mar. 17, 2005

(51) Int. Cl.
*C08F 36/04* (2006.01)
*C08F 283/14* (2006.01)
*C08L 47/00* (2006.01)

(52) U.S. Cl. .................. 525/54.2; 525/44; 525/162; 525/187; 525/326.7; 525/327.3; 525/540; 524/505

(58) Field of Classification Search ............. 525/162, 525/54.2, 187, 326.7, 327.3, 540, 44; 524/505
See application file for complete search history.

(56) References Cited

U.S. PATENT DOCUMENTS

| | | | |
|---|---|---|---|
| 4,948,843 A | 8/1990 | Roberts et al. | |
| 4,950,587 A | 8/1990 | Roberts et al. | |
| 5,408,109 A | 4/1995 | Heeger et al. | |
| 5,612,221 A | 3/1997 | Simons et al. | |
| 5,869,350 A | 2/1999 | Heeger et al. | |
| 5,881,083 A | 3/1999 | Diaz-Garcia et al. | |
| 5,968,762 A | 10/1999 | Jadamec et al. | |
| 5,990,479 A | 11/1999 | Weiss et al. | |
| 6,280,933 B1 | 8/2001 | Glazer et al. | |
| 6,350,431 B1* | 2/2002 | Snow et al. | 424/9.6 |
| 6,534,329 B1 | 3/2003 | Heeger et al. | |
| 6,743,640 B1 | 6/2004 | Whitten | |
| 2002/0009728 A1 | 1/2002 | Bittner | |
| 2002/0034747 A1 | 3/2002 | Bruchez | |
| 2002/0150759 A1 | 10/2002 | Jones | |
| 2002/0177136 A1 | 11/2002 | McBranch | |
| 2003/0054413 A1 | 3/2003 | Kumaraswamy | |
| 2004/0241768 A1 | 12/2004 | Whitten | |

FOREIGN PATENT DOCUMENTS

| | | |
|---|---|---|
| WO | WO 99/35288 A1 | 7/1999 |
| WO | WO 00/14278 A1 | 3/2000 |
| WO | WO 00/66790 A1 | 11/2000 |
| WO | WO 02/081735 A2 | 10/2002 |
| WO | WO 2004/001379 A2 | 12/2003 |

OTHER PUBLICATIONS

U.S. Appl. No. 60/202,647, filed May 8, 2000, Whitten.
U.S. Appl. No. 60/226,902, filed Aug. 23, 2000, Whitten.
U.S. Appl. No. 60/230,186, filed Sep. 1, 2000, Phillips.
U.S. Appl. No. 60/237,000, filed Sep. 29, 2000, Bruchez.

(Continued)

*Primary Examiner*—James J. Seidleck
*Assistant Examiner*—Olga Asinovsky
(74) *Attorney, Agent, or Firm*—David W. Maher

(57) ABSTRACT

Methods, compositions and articles of manufacture involving cationic conjugated conformationally flexible polymers are provided. A method for the synthesis of cationic water-soluble polymers with linkages along the polymer main chain structure which disrupt the ability of the polymers to form extended-rod structures is provided. Such polymers may serve in the fabrication of novel optoelectronic devices and in the development of highly efficient biosensors. The invention further relates to the application of these polymers in assay methods.

17 Claims, 10 Drawing Sheets

OTHER PUBLICATIONS

U.S. Appl. No. 60/240,216, filed Oct. 13, 2000, Bruchez.
U.S. Appl. No. 60/276,090, filed Mar. 16, 2001, Jones.
U.S. Appl. No. 60/314,094, filed Aug. 23, 2001, Burdick.
U.S. Appl. No. 60/314,101, filed Aug. 23, 2001, Whitten.
Wang et al., "Size-Specific Interactions Between Single- and Double-Stranded Oligonucleotides and Cationic Water-Soluble Oligofluorenes", Adv. Funct. Mater., Jun. 2003, 13(6), 463-467.
Stork et al., "Energy Transfer in Mixtures of Water-Soluble Oligomers: Effect of Charge, Aggregation, and Surfactant Complexation", Adv. Mater., Mar. 2002, 14(5), 361-366.
Leclerc, "Optical and Electrochemical Transducers Based on Functionalized Conjugated Polymers", Adv. Mater., 1999, 11(18), 1491-1498.
Balakin et al., "Conjugates of oligonucleotides with polyaromatic fluorophores as promising DNA probes", Biosensors & Bioelectronics, 1998, 13, 771-778.
Ho et al., "Colorimetric and Fluormetric Detection of Nucleic Acids Using Cationic Polythiophene Derivatives", Angew. Chem. Int. Ed., 2002, 41(9), 1548-1551.
McQuade et al., "Conjugated Polymer-Based Chemical Sensors", Chem. Rev., 2000, 100, 2537-2574.
Chen et al., "Highly sensitive biological and chemical sensors based on reversible fluorescence quenching in a conjugated polymer", PNAS, Oct. 1999, 96(22), 12287-12292.
Liu et al., "Effect of Chromophore-Charge Distance in the Energy Transfer Properties of Water-Soluble Conjugated Oligomers", J. Am. Chem. Soc., 2003, 125, 6705-6714.
Gaylord et al., "DNA detection using water-soluble conjugated polymers and peptide nucleic acid probes", PNAS, Aug. 2002, 99(17), 10954-10957.
Bronich et al., "Recognition of DNA Topology in Reactions between Plasmid DNA and Cationic Copolymers", J. Am. Chem. Soc., Sep. 2000, 122(35), 8339-8343.
Chen et al., "Tuning the Properties of Conjugated Polyelectrolytes through Surfactant Complexation", J. Am. Chem. Soc., 2000, 122, 9302-9303.
Gaylord et al., "Water-Soluble Conjugated Oligomers: Effect of Chain Length and Aggregation on Photoluminescene-Quenching Efficiencies", J. Am. Chem. Soc., 2001, 123, 6417-6418.
Hong et al., "Water-Soluble Oligmer Dimers Based on Paracyclophane: A New optical Platform for Fluorescent Sensor Applications", J. Am. Chem. Soc., 2002, 124, 11868-11869.
Gaylord et al., "DNA Hybridization Detection with Water-Soluble Conjugated Polymers and Chromophore-Labeled Single-Stranded DNA", J. Am. Chem. Soc., 2003, 125, 896-900.
Zhou et al., "Fluorescent Chemosensors Based on Energy Migration in Conjugated Polymers: The Molecular Wire Approach to Increased Sensitivity", J. Am. Chem. Soc., 1995, 117, 12593-12602.
Zhou et al., "Methodology for Enhancing the Sensitivity of Fluorescent Chemosensors: Energy Migration in Conjugated Polymers", J. Am. Chem. Soc., 1995, 117, 7017-7018.
Hawkins et al., "Incorporation of a fluorescent guanosine analog into oligonucleotides and its application to a real time assay for the HIV-1 integrase 3'-processing reaction", Nucleic Acids Research, 1995, 23(15), 2872-2880.
Cardullo et al., "Detection of Nucleic Acid Hybridization by Nonradiative Fluorescence Resonance Energy Transfer", Proc. Natl. Acad. Sci. USA, Dec. 1998, 85, 8790-8794.
Gallot et al., "Poly(L-lysine) containing azobenzene units in the side chains: Influence of the degree of substitution on liquid crystalline structure and thermotropic behaviour", Liquid Crystals, 1997, 23(1), 137-146.
Wang et al., "Biosnesors from conjugated polyelectrolyte complexes", PNAS, Jan. 2002, 99(1), 49-53.
Liu et al., "Methods for strand-specific DNA detection with cationic conjugation polymers suitable for incorporation into DNA chips and microarrays", PNAS Early Edition, Dec. 2004, p. 1-5.
Vehse et al., "Light Amplification by Optical Excitation of a Chemical Defect in a Conjugated Polymer", Adv. Mater., Jun. 2004, 16(12), 1001-1004.

Liu et al., "Shape-Adapable Water-Soluble Conjugated Polymers", J. Am. Cham. Soc., 2003, 125, 13306-13307.
Liu et al., "Interpolyelectrolyte Complexes of Conjugated Copolymers and DNA: Platforms for Multicolor Biosensors", J. Am. Chem. Soc., 2004, 126, 1942-1943.
Huang et al., "High-Efficiency, Evironment-Friendly Electroluminescent Polymers with Stable High Work Function Metal as a Cathode: Green- and Yellow-Emitting Conjugated Polyfluorene Polyelectrolytes and Their Neutral Precursors", J. Am. Chem. Soc., 2004, 126, 9845-9853.
Service, "DNA Analysis: Microchip Arrays Put DNA on the Spot", The American Association for the Advancement of Science, Oct. 1998, 282(5388), 396-399.
Southern, "DNA chips: analysing sequence by hybridization to oligonucleotides on a large scale", TIG, Mar. 1996, 12(3), 110-115.
Epstein et al., "Microarray technology—enhanced versatility, persistant challenge", Current Opinion in Biotechnology, 2000, 11, 36-41.
Heeger et al., "Making Sense of polymer-based biosensors", PNAS, Oct. 1999, 96(22), 12219-12221.
Patel et al., "Energy transfer analysis of Fos-Jun dimerization and DNA binding", Proc. Natl. Sci. USA, Jul. 2994, 91, 7360-7364.
Lohse et al., "Fluorescein-Conjugated Lysine Monomers for Solid Phase Synthesis of Fluorescents Peptides and PNA Oligomers", Bioconjugate Chem., 1997, 8, 503-509.
Smith et al., "The synthesis of oligonucleotides containing an aliphatic amino group at the 5' terminus: synthesis of fluorescent DNA primers for use in DNA sequence analysis", Nucleic Acids Research, 1985, 13(7) 2399-2412.
Wintermeyer et al., "Fluorescent Derivatives of Yeast tRNA(TM)", Eur. J. Biochem., 1979, 98, 465-475.
Lipshutz et al., "High density synthetic oligonucleotide arrays", Nature Genetics Supplement, Jan. 1999, 21, 20-24.
Nilsson et al., "Chip solution detection of DNA hybridization using a luminescent zwitterlonic polythiophene derivative", Nature Materials, Jun. 2003, 2, 419-424 (Supplementary Information pp. 1-2).
Dore et al., "Fluorescent Polymeric Transducer for the Rapid, Simple, and Specific Detection of Nucleic Acids at the Zeptomole Level", J. Am. Chem. Soc., 2004, 126, 4240-4244.
Ranade et al., "High-Throughput Genotyping with Single Nucleotide Polymorphisms", Genone Research, 2001, 11, 1262-1268.
Schork et al., "Single nucleotide polymorphisms and the furture if genetic epidemiology", Clin. Genet., 2000, 58, 250-264.
Wang et al., "Optically Amplified RNA-Protein Detection Methods Using Light-Harvesting Conjugated Polymers", Adv. Mater., Sep. 2003, 15(17), 1425-1428.
Liu et al., "Homogeneuos Fluorescents-Based DNA Detection with Water-Soluble Conjugated Polymers", Chem. Mater., 2004, 16, 4467-4476.
Wolcott, "Advances in Nucleic Acid-Based Detection Methods", Clinical Microbiology Reviews, Oct. 1992, 5(4), 370-386.
Umek et al., "Electronic Detection of Nucleic Acids, A Versatile Platform for Molecular Diagnostics", Journal of Molecular Diagnostics, May 2001, 3(2), 74-84.
Stevens et al., "Exciton dissociation mechanisms in the polymeric semiconductors poly(9,9-dioctylfluorene) and poly(9,9-dioctylfluorene-co-benzothiadiazole)", Physical Review 8, Apr. 2001, 63, 1-18.
Wang, "Survey and Summary From DNA biosensors to gene chips", Nucleic Acids Research, 2000, 28(16), 3011-3016.
Beier et al., "Versatile derivatisation of solid support media for covalent bonding on DNA-microchips", Nucleic Acids Research, 1999, 27(9), 1970-1977.
Balakin, K.V. et al. Conjugates of oligonucleotides with polyaromatic fluorophores as promising DNA probes[1:] Biosensors and Bioelectronics (1998) 13:771-778.
Bardea, A. et al. Sensing and amplification of oligonucleotide-DNA interactions by means of impedance spectroscopy: a route to a Tay-Sachs sensor; Chem. Commun. (1999) 21-22.
Baur, J.W., et al. Thin-Film Light-Emitting Devices Based on Sequentially Adsorbed Multilayers of Water-Soluble Poly (ρ-phenylene)s: Advanced Materials (1998) 10:17:1452-1455.

Behr, J.P. Synthetic Gene-Transfer Vectors; Acc. Chem. Res. (1993) 26:274-278.

Behr, J.P. DNA Strongly Binds to Micelles and Vesicles Containing Lipopolyamines or Lipointercalants; Tetrahedron Lett. (1986) 27:48:5861-5864.

Benson, S.C. et al. Heterodimeric DNA-binding dyes designed for energy transfer: synthesis and spectroscopic properties; Nucleic Acids Res. (1993) 21:24:5727-5735.

Betts, L., et al. A Nucleic Acid Triple Helix Formed by a Peptide Nucleic Acid-DNA Complex; Science (1995) 270: 1838-1841.

Bhattacharya, S. and Mandal, S.S. Interaction of surfactants with DNA. Role of hydrophobicity and surface charge on intercalation and DNA melting; Biochim.et Biophys. Acta. (1997) 1323:29-44.

Bhattacharya, S. and Mandal, S.S. Role of hydrophobic effect and surface charge in surfactant-DNA association; Indian J. Biochem. & Biophys. (1997) 34:11-17.

Bier, F.F. and Kleinjung, F. Feature-size limitations of microarray technology—a critical review; Fresenius J. Anal. Chem. (2001) 371:151-156.

Birnboim, H.C. and Jevcak, J.J. Fluorometric Method for Rapid Detection of DNA Strand Breaks in Human White Blood Cells Produced by Low Doses of Radiation; Cancer Res. (1981) 41:1889-1892.

Blessing, T. et al. Monomolecular collapse of plasmid DNA into stable virus-like particles; Proc. Natl. Acad. Sci. USA (1998) 95:1427-1431.

Bronich, T.K. et al. Recognition of DNA Topology in Reactions between Plasmid DNA and Cationic Copolymers; J. Am. Chem. Soc. (2000) 122:35:8339-8343.

Cardullo, R.A. et al. Detection of nucleic acid hybridization by nonradiative fluorescence resonance energy transfer; Proc. Natl. Acad. Sci. USA (1988) 85:8790-8794.

Castro, A. and Williams, J.G.K. Single-molecule detection of specific nucleic acid sequences in unamplified genomic DNA; Anal. Chem. (1997) 69:19:3915-3920.

Chandar, P. et al. Fluorescence probe investigation of anionic polymer-cationic surfactant interactions; Macromolecules (1988) 21:950-953.

Chehab, F.F. and Kan, Y.W. Detection of specific DNA sequences by fluorescence amplification: A color complementation assay; Proc. Natl. Acad. Sci. USA (1989) 86:9178-9182.

Chen, L. and Frankel, A.D. A peptide interaction in the major groove of RNA resembles protein interactions in the minor groove of DNA; Proc. Natl. Acad. Sci. USA. (1995) 92:5077-5081.

Chen, L. et al. Highly sensitive biological and chemical sensors based on reversible fluorescence quenching in a conjugated polymer; Proc. Natl. Acad. Sci. USA. (1999) 96:22:12287-12292.

Chen, W. et al. Using Ethidium Bromide to Probe the Interactions between DNA and Dendrimers; Langmuir (2000) 16:15-19.

Delling, U. et al. The number of positively charged amino acids in the basic domain of Tat is critical for transactivation and complex formation with TAR RNA; Proc. Natl. Acad. Sci. USA (1991) 88:6234-6238.

Demidov, V.V. PNA and LNA throw light on DNA; Trends in Biotechnology (2003) 21:1:4-7.

Demidov, V.V. et al. Stability of peptide nucleic acids in human serum and cellular extracts; Biochem. Pharmacol. (1994) 48:6:1310-1313.

Didenko, V.V. DNA Probes Using Fluorescence Resonance Energy Transfer (FRET): Designs and Applications; BioTechniques (2001) 31:5:1106-1121.

Dogariu, A. et al. Time-resolved Förster energy transfer in polymer blends; Synthetic Metals (1999) 100:95-100.

Dufourcq, J. et al. Molecular assembling of DNA with amphipathic peptides; FEBS Lett. (1998) 421:7-11.

Eastman, S.J. et al. Biophysical characterization of cationic lipid: DNA complexes; Biochim. et Biophys. Acta (1997) 1325:41-62.

Egholm, M. et al. PNA hybridizes to complementary oligonucleotides obeying the Watson-Crick hydrogenbonding rules; Nature (1993) 365:566-568.

Egholm, M. et al. Recognition of Guanine and Adenine in DNA by Cytosine and Thymine Containing Peptide Nucleic Acids (PNA); J. Am. Chem. Soc. (1992) 114:9677-9678.

Englebienne, P. Synthetic materials capable of reporting biomolecular recognition events by chromic transition; J. Mater Chem. (1999) 9:1043-1054.

Eskilsson, K. et al. DNA-Surfactant Complexes at Solid Surfaces; Langmuir (2001) 17:1666-1669.

Felgner, P.L. et al. Nomenclature for Synthetic Gene Delivery Systems; Hum. Gene Ther. (1997) 8:511-512.

Ferguson, B.Q. and Yang, D.C.H. Localization of Noncavalently Bound Ethidium in Free and Methlonyl-tRNA Synthetase Bound $tRNA^{fMet}$ by Singlet-Singlet Energy Transfer; Biochemistry (1986) 25:5298-5304.

Fernandez-Saiz, M. et al. A Cationic Cyclophane That Forms a Base-Pair Open Complex with RNA Duplexes; J. Am. Chem. Soc. (1996) 118:4739-4745.

Frankel, A.D. Peptide models of the Tat-TAR protein-RNA interaction; Prot. Sci. (1992) 1:1539-1542.

Futami, J. et al. Optimum Modification for the Highest Cytotoxicity of Cationized Ribonuclease; J. Biochem. (2002) 132:223-228.

Gallego, J. and Varani, G. Targeting RNA with Small-Molecule Drugs: Therapeutic Promise and Chemical Challenges; Acc. Chem. Res. (2001) 34:10:836-843.

Gallo, R and Montagnier, L. AIDS in 1988; Sci. Am. (1988) 259:4: 41-48.

Ganachaud, F. et al. Adsorption of Single-Stranded DNA Fragments onto Cationic Aminated Latex Particles; Langmuir (1997) 13:701-707.

Gaylord, B. S. et al. DNA detection using water-soluble conjugated polymers and peptide nucleic acid probes; Proc. Natl. Acad. Sci. USA (2002) 99:17:10954-10957.

Gaylord, B.S. et al. Water-Soluble Conjugated Oligomers: Effect of Chain Length and Aggregation on Photoluminescence-Quenching Efficiencies; J. Am. Chem. Soc. (2001) 123:6417-6418.

Gaylord, B.S. et al. DNA Hybridization Detection with Water-Soluble Conjugated Polymers and Chromophore-Labeled Single-Stranded DNA; J. Am. Chem. Soc. (2003) 125:896-900.

Gershon, H. et al. Mode of Formation and Structural Features of DNA-Cationic Liposome Complexes Used for Transfection; Biochemistry (1993) 32:7143-7151.

Giesen, U. et al. A formula for thermal stability ($T_m$) prediction of PNA/DNA duplexes; Nucleic Acids Res. (1998) 26:21:5004-5006.

Gössl, L. et al. Molecular Structure of Single DNA Complexes with Positively Charged Dendronized Polymers; J. Am. Chem. Soc. (2002) 124:6860-6865.

Hage, D.S., Immunoassays; Anal. Chem. (1999) 71:12:294R-304R.

Hanvey, J.C. et al. Antisense and Antigene Properties of Peptide Nucleic Acids; Science (1992) 258:1481-1485.

Harada, A. and Kataoka, K. Chain Length Recognition: Core-Shell Supramolecular Assembly from Oppositely Charged Block Copolymers; Science (1999) 283:65-67.

Ho, H.A. et al. Colorimetric and Fluorometric Detection of Nucleic Acids Using Cationic Polythiophene Deriatives; Angew. Chem. Int. Ed. (2002) 41:9:1548-1551.

Izumrudov, V.A. et al. The influence of chain length of a competitive polyanion and nature of monovalent counterions on the direction of the substitution reaction of polyelectrolyte complexes; Makromol. Chem., Rapid Commun. (1988) 9:7-12.

Izumrudov, V.A. et al. Competitive Reactions in Solutions of DNA and Water-Soluble Interpolyelectrolyte Complexes; Biopolymers (1995) 35:523-531.

Izumrudov, V.A. et al. Competitive Displacement of Ethidium Cations Intercalated in DNA by Polycations; Dokl. Phys. Chem. (1995) 342:Nos. 4-6: 150-153.

Izumrudov, V.A. et al. Ethidium Bromide as a Promising Probe for Studying DNA Interaction with Cationic Amphiphiles and Stability of the Resulting Complexes; Langmuir (2002) 18:10348-10356.

Izumrudov, V.A. et al. Controllable Stability of DNA-Containing Polyelectrolyte Complexes in Water-Salt Solutions; Biopolymers. (1999) 52:94-108.

Izumrudov, V.A. and Zhiryakova, M.V. Stability of DNA-containing interpolyelectrolyte complexes in water-salt solutions; Macromol. Chem. Phys. (1999) 200:11:2533-2540.

Jain, C. and Belasco, J.G. Rapid Genetic Analysis of RNA-Protein Interactions by Translational Repression in *Escherichia coli*; *Methods Enzymol.* (2000) 318:309-332.

Jenkins, Y. and Barton, J.K. A Sequence-Specific Molecular Light Switch: Tethering of an Oligonucleotide to a Dipyridophenazine Complex of Ruthenium (II); *J. Am. Chem. Soc.* (1992) 114:8736-8738.

Johansson, M.K. et al. Intramolecular Dimers: A New Strategy to Fluorescence Quenching in Dual-Labeled Oligonucleotide Probes; *J. Am. Chem. Soc.* (2002) 124:6950-6956.

Kabanov, A.V. et al. DNA Interpolyelectrolyte Complexes as a Tool for Efficient Cell Transformation; *Biopolymers.* (1991) 31:1437-1443.

Kabanov, A.V. and Kavanov, V.A. DNA Complexes with Polycations for the Delivery of Genetic Material into Cells; *Bioconjugate Chem.* (1995) 6:7-20.

Kabanov, V.A. et al. Cooperative Interpolyelectrolyte Reactions; *Makromol. Chem. Suppl.* (1985) 13:137-155.

Karn, J. et al. HIV A Practical Approach; RNA binding assays for the regulatory proteins Tat and Rev; *IRL Press,* New York; (1995) 9:147-165.

Katayose, S. and Kataoka, K. Water-Soluble Polyion Complex Associates of DNA and Poly(ethylene glycol)- Poly($_L$-lysine) Block Copolymer; *Bioconjugate Chem.* (1997) 8:702-707.

Kircheis, R. et al. Tumor targeting with surface-shielded ligand-polycation DNA complexes; *J. Controlled Release;* (2001) 72:165-170.

Kirsh, Yu. E. et al. Comparison of Properties of an Oxime-Bound Partially Quaternized Poly-4-Vinylpyridine and a Monomer Analogous Oxime; *Eur. Polym. J.* (1974) 10:393-399.

Knemeyer, J. et al. Probes for Detection of Specific DNA . . . *Anal. Chem.* (2000) 72:3717-3724.

Kwon, I.C. et al. Electrically Erodible polymer gel for controlled release of drugs; *Nature* (1991) 354:291-293.

Leclerc M. Optical and Electrochemical Transducers Based on Functionalized Conjugated Polymers; *Adv. Mater,* (1999) 11:18:1491-1498.

Lee, M.A. et al. ResonSense®: simple linear fluorescent probes for quantitative homogeneous rapid polymerase chain reaction; *Anal. Chim. Acta* (2002) 457:61-70.

Le-Pecq, J.B. and Paoletti, C. A Fluorescent Complex between Ethidium Bromide and Nucleic Acids; *J. Mol Biol.* (1967) 27:87-106.

Leulliot, N. and Varani, G. Current Topics in RNA-Protein Recognition: Control of Specificity and Biological Function through Induced Fit and Conformational Capture; *Biochemistry* (2001) 40:27:7947-7956.

Liu, B. et al. Effect of Chromophore-Charge Distance on the Energy Transfer Properties of Water-Soluble Conjugated Oligomers; *J. Am. Chem. Soc.* (2003) 125:6705-6714.

Makino, S. et al. Molecular Characterization and Protein Analysis of the *cap* Region, Which is Essential for Encapsulation in *Bacillus anthracis; J. Bacteriol.* (1989) 171:2:722-730.

Manning, G.S. Thermodynamic Stability Theory for DNA Doughnut Shapes Induced by Charge Neutralization; *Biopolymers.* (1980) 19:37-59.

Manning, G.S. The Possibility of Intrinsic Local Curvature in DNA Toroids; *Biopolymers.* (1981) 20:1261-1270.

Manning, G.S. The molecular theory of polyelectrolyte solutions with applications to the electrostatic properties of polynucleotides; *Qrtly Review of Biophysics.* (1978) v.11: 179-246.

Maruyama, A. et al. Characterization of Interpolyelectrolyte Complexes between Double-Stranded DNA and Polylysine Comb-Type Copolymers Having Hydrophilic Side Chains; *Bioconjugate Chem.* (1998) 9:292-299.

Matsumoto, C; et al. High-Throughput Screening Utilizing Intramolecular Fluorescence Resonance Energy Transfer for the Discovery of the Molecules that Bind HIV-1 TAR RNA Specifically; *Bioorg. Med. Chem. Lett.* (2000) 10:1857-1861.

McLoughlin, D.M. et al. A simple and effective separation and purification procedure for DNA fragments using Dodecyltrimethylammonium bromide; *Bioseparation.* (2001) 9:307-313.

McQuade, D.T. et al. Conjugated Polymer-Based Chemical Sensors; *Chem. Rev.* (2000) 100:2537-2574.

McQuade, D.T. et al. Signal amplification of a "Turn-On" Sensor: Harvesting the Light Captured by a Conjugated Polymer; *J. Am. Chem. Soc.* (2000) 122:12389-12390.

Mel'nikov, S.M. et al. Discrete Coil—Globule Transition of Large DNA Induced by Cationic Surfactant; *J. Am. Chem. Soc.* (1995) 117:2401-2408.

Mergny, J.L. et al. Fluorescence Energy Transfer between Two Triple Helix-Forming Oligonucleotides Bound to Duplex DNA; *Biochemistry.* (1994) 33:15321-15328.

Miao, Y.J. et al. Photophysics of Poly(paracyclophan-1-ene) and Derivatives: Evidence for Intrachain Energy Transfer and Chromophore Aggregation; *J. Am. Chem. Soc.* (1995) 117:11407-11420.

Miller, I.R. and Bach, D. Interaction of DNA with Heavy Metal Ions and Polybases: Cooperative Phenomena; *Biopolymers.* (1968) 6:169-179.

Minehan, D.S. et al. Kinetics of DNA Binding to Electrically Conducting Polypyrrole Films; *Macromolecules.* (1994) 27:777-783.

Morgan, A.R. and Pulleyblank, D.E. Native and Denatured DNA, Cross-Linked and Palindromic DNA and Circular Covalently-Closed DNA Analysed by a Sensitive Fluorometric Procedure; *Biochem. Biophys. Res. Commun.* (1974) 61:2:396-403.

Nielsen, P.E. Applications of peptide nucleic acids, *Analytical biotechnology.* (1999) 10:71-75.

Nguyen, H-K, et al. Nonviral Transfer Technology: Evaluation of polyether-polyethyleneimine graft copolymers as gene transfer agents; *Gene Ther.* (2000) 7:126-138.

Nishanian, P. et al. A Simple Method for Improved Assay Demonstrates that HIV p24 Antigen is Present as Immune Complexes in Most Sera from HIV-Infected Individuals; *J. Infect. Dis.* (1990) 162:21-28.

Nuovo, G.J. *In Situ* Localization of PCR-Amplified DNA and cDNA; *Methods Mol. Bio.* (2000) 123:217-238.

Olins, D.E. et al. Model Nucleoprotein Complexes: Studies on the Interaction of Cationic Homopolypeptides with DNA; *J. Mol. Biol.* (1967) 24:157-176.

Pasternack, R.F. et al. Long-Range Fluorescence Quenching of Ethidium Ion by Cationic Porphyrins in the Presence of DNA; *J. Am. Chem. Soc.* (1991) 113:6835-6840.

Patolsky, F. et al. Amplified DNA Detection by Electrogenerated Biochemiluminescence and by the Catalyzed Precipitation of an Insoluble Product on Electrodes in the Presence of the Doxorubicin Intercalator; *Angew. Chem. Int. Ed.* (2002) 41:18:3398-3402.

Patolsky, F. et al. Electronic Transduction of DNA Sensing Processes on Surfaces: Amplification of DNA Detection and Analysis of Single-Base Mismatches by Tagged Liposomes; *J. Am Chem. Soc.* (2001) 123:5194-5205.

Peterlinz, K.P. et al. Observation of Hybridization an Dehybridization of Thiol-Tethered DNA using Two-Color Surface Plasmon Resonance Spectroscopy; *J. Am. Chem. Soc.* (1997) 119:3401-3402.

Petty, J.T. et al. Thermodynamic Characterization of the Association of Cyanine Dyes with DNA; *J. Phys. Chem. B.* (2000) 104:7221-7227.

Pilipenko, E.V. et al. A cell cycle-dependent protein serves as a template-specific translation initiation factor; *Genes & Dev.* (2000) 14:2028-2045.

Pinto, M.R. and Schanze, K.S. Conjugated Polyelectrolytes: Synthesis and Applications; *Synthesis.* (2002) 9:1293-1309.

Plank, C. et al. Branched Cationic Peptides for Gene Delivery: Role of Type and Number of Cationic Residues in Formation and *in Vitro* Activity of DNA Polyplexes; *Hum. Gene Ther.* (1999) 10:319-332.

Portela, A. and Digard, P. The influenza virus nucleoprotein: a multifunctional RNA-binding protein pivotal to virus replication; *J. Gen. Virol.* (2002) 83:723-734.

Puglisi, J.D. et al. Conformation of the TAR RNA-Arginine Complex by NMR Spectroscopy; *Science.* (1992) 257:76-80.

Pullman, B. et al. Two Aspects of DNA Polymorphism and Microheterogeneity: Molecular Electrostatic Potential and Steric Accessibility; *J. Biochem.* (1982) 124:229-238.

Richter, S. et al. Specific HIV-1 TAR RNA Loop Sequence and Functional Groups are Required for Human Cyclin T1-Tat-TAR Ternary Complex Formation; *Biochemistry.* (2002) 41:6391-6397.

Saghatelian, A. et al. DNA Detection and Signal Amplification via an Engineered Allosteric Enzyme; *J. Am. Chem. Soc.* (2003) 125:344-345.

Saiki, R.K. et al. Enzymatic Amplification of β-Globin Genomic Sequences and Restriction Site Analysis for Diagnosis of Sickle Cell Enemia; *Science.* (1985) 230:1350-1354.

Schork, N.J. et al. Single nucleotide polymorphisms and the future of genetic epidemiology; *Clin. Genet.* (2000) 58:250-264.

Seymour, L.W. et al. Cationic block copolymers as self-assembling vectors for gene delivery; *Self-assembling Complexes for Gene Delivery;* (1998) 11:219-239.

Shinozuka, K. et al. A Novel Multifunctionalily Labelled DNA Probe Bearing an Intercalator and a Fluorophore; *J. Chem. Soc., Chem. Commun.* (1994) 1377-1378.

De Smedt, S.C. et al. Cationic Polymer Based Gene Delivery Systems; *Pharm. Res.* (2000) 17:2:113-126.

Smith, J.O. et al. Molecular Recognition of PNA-Containing Hybrids: Spontaneous Assembly of Helical Cyanine Dye Aggregates on PNA Templates; *J. Am. Chem. Soc.* (1999) 121:2686-2695.

Smith, P. et al. Surfactant structure around DNA in aqueous solution; *Phys. Chem. Chem. Phys.* (2000) 2:1305-1310.

Stender, H. et al. PNA for rapid microbiology; *J. Microbiological Methods.* (2002) 48:1-17.

Stork, M. et al. Energy Transfer in Mixtures of Water-Soluble Oligomers: Effect of Charge, Aggregation, and Surfactant Complexation; *Adv. Mater.* (2002) 14:5:361-366.

Su, X et al. Au nanoparticle- and silver-enhancement reaction-amplified microgravimetric biosensor; *Chem. Commun.* (2001) 755-756.

Sullenger, B.A. and Gilboa, E. Emerging clinical applications of RNA; *Nature.* (2002) 418:252-258.

Takakusa, H. et al. Design and Synthesis of an Enzyme-Cleavable Sensor Molecule for Phosphodiesterase Activity Based on Fluorescence Resonance Energy Transfer; *J. Am. Chem. Soc.* (2002) 124:8:1653-1657.

Tamilarasu, N. et al. A New Strategy for Site-Specific Protein Modification: Analysis of a Tat Peptide-TAR RNA Interaction; *Bioconjugate Chem.* (2001) 12:2:135-138.

Tang, M.X. and Szoka, F.C. The influence of polymer structure on the interactions of cationic polymers with DNA and morphology of the resulting complexes; *Gene Ther.* (1997) 4:823-832.

Demers, L.M. et al. Thermal Desorption: J. Am. Chem. Soc(2002) 124, 11248-11249.

Taton, T.A. et al. Scanometric DNA Array Detection with Nanoparticle Probes; *Science.* (2000) 289:1757-1760.

Taton, T.A. et al. Two-Color Labeling of Oligonucleotide Arrays via Size-Selective Scattering of Nanoparticle Probes; *J. Am. Chem. Soc.* (2001) 123:5164-5165.

Tomac, S. et al. Ionic Effects on the Stability and Conformation of Peptide Nucleic Acid Complexes; *J. Am. Chem. Soc.* (1996) 118:5544-5552.

Traser, S. et al. Syntheses and solution properties of water-soluble poly(p-phenylene)s bearing oligo(ethylene oxide) and trialkylamino side groups; *e-Polymers.* (2002) 32:1-39.

Umek, R.M. et al. Electronic Detection of Nucleic Acids—A Versatile Platform for Molecular Diagnostics; *J. Mol. Diag.* (2001) 3:2:74-84.

Vaishnav, Y.N. and Wong-Staal, F. The Biochemistry of Aids; *Ann. Rev. Biochem.* (1991) 60:577-630.

Varani, G. RNA-Protein Intermolecular Recognition; *Acc. Chem. Res.* (1997) 30:5:189-195.

Vinogradov, S.V. et al. Self-Assembly of Polyamine-Poly(ethylene glycol) Copolymers with Phosphorothioate Oligonucleotides; *Bioconjugate Chem.* (1998) 9:805-812.

Wang, J. et al. Photoluminescence of Water-Soluble Conjugated Polymers: Origin of Enhanced Quenching by Charge Transfer; *Macromolecules.* (2000) 33:5153-5158.

Wang, J. et al. DNA Electrochemical Biosensor for the Detection of Short DNA Sequences Related to the Human Immunodeficiency Virus; *Anal. Chem.* (1996) 68:15:2629-2634.

Isola, N.R. et al. Surface-Enhanced Raman Gene Probe for HIV Detection; *Anal. Chem.* (1998) 70:1352-1356.

Wang, J. Survey and Summary From DNA biosensors to gene chips; *Nucleic Acid Res.* (2000) 28:16:3011-3016.

Wang, J. et al. Dendritic Nucleic Acid Probes for DNA Biosensors; *J. Am. Chem. Soc.* (1998) 120:8281-8282.

Wang, J. et al. Synthesis of AB(BA), ABA and BAB Block Copolymers of tert-Butyl Methacrylate (A) and Ethylene Oxide (B); *J. Polym. Sci., Part A: Polym. Chem.* (1992) 30:2251-2261.

Wang, Y. et al. Inte raction of DNA with Cationic Micelles: Effects of Micelle Surface Charge Density, Micelle Shape, and Ionic Strength on Complexation and DNA Collapse; *Langmuir.* (2001) 17:1670-1673.

Waring, M. J. Complex Formation between Ethidium Bromide and Nucleic Acids; *J. Mol. Biol.* (1965) 13:269-282.

Weeks, K.M. et al. Fragments of the HIV-1 Tat Protein Specifically Bind TAR RNA; *Science.* (1990) 249:1281-1285.

Whitcombe, D. et al. Detection of PCR products using self-probing amplicons and fluorescence; *Nat. Biotechnol.* (1999) 17:804-807.

Wolfert, M.A. et al. Polyelectrolyte Vectors for Gene Delivery: Influence of Cationic Polymer on Biophysical Properties of Complexes Formed with DNA; *Bioconjugate Chem.* (1999) 10:993-1004.

Wyman, T.B. et al. Design, Synthesis, and Characterization of a Cationic Peptide that Binds to Nucleic Acids and Permeabilizes Bilayers; *Biochemistry.* (1997) 36:3008-3017.

Xu, X.H. and Bard, A.J. Immobilization and Hybridization of DNA on an Aluminum(III) Alkanebisphosphonate Thin Film with Electrogenerated Chemiluminescent Detection; *J. Am. Chem. Soc.* (1995) 117:2627-2631.

Yang, J.S. and Swager, T.M. Fluorescent Porous Polymer Films as TNT Chemosensors: Electronic and Structural Effects; *J. Am. Chem. Soc.* (1998) 120:11864-11873.

Junhui, Z. et al. DNA Based Biosensors; *Biotechnol. Adv.* (1997) 15:43-58.

* cited by examiner

US 7,144,950 B2

CONFORMATIONALLY FLEXIBLE CATIONIC CONJUGATED POLYMERS

STATEMENT REGARDING FEDERALLY SPONSORED RESEARCH

Work leading to this invention was performed under grant number GM62958-01 from the National Institutes of Health, grant number DMR-0097611 from the National Science Foundation and grant number N00014-98-1-0759 from the Office of Naval Research. The U.S. Government may have limited rights in this invention.

TECHNICAL FIELD

This invention relates to methods, articles and compositions involving cationic conjugated polymers ("CCPs").

BACKGROUND OF THE INVENTION

Conjugated polymers (CPs) are efficient light-gathering molecules with properties desirable for a variety of applications. Conjugated polymers can serve as light harvesting materials and signal transducers in fluorescent biosensor applications.[1,2] These molecules can detect, transduce and/or amplify chemical, biological or physical information into optical and/or electrical signals.[3,4] CPs can provide the advantage of collective response relative to non-interacting small molecules.[5,6] This collective response influences optoelectronic properties, such as Förster resonance energy transfer (FRET), electrical conductivity and fluorescence efficiency, properties which can be used to report, or "transduce," target analyte presence.[6]

Water solubility of CPs, a prerequisite for interrogating biological substrates, is usually achieved by charged groups attached to the CP backbone.[7] To date, however, most of the available ionic conjugated polymers are polyanions containing sulfonate or carboxylate functionalities.

Conjugated polymers frequently take the form of rigid-rod structures which have limited flexibility and consequently have a limited ability to adapt to particular three dimensional shapes, thus limiting their ability to conform to the shape of biologically-derived molecules. For example, proteins and nucleic acids, although also polymeric, do not typically form extended-rod structures but rather fold into higher-order three-dimensional shapes to which CPs cannot typically conform.

All the currently available cationic water-soluble conjugated polymers have generally linear "rigid-rod" polymer backbones and therefore experience a limited twist angle between monomer units along the polymer main chain. A consequence of this torsional restriction is that the polymer has a "rigid rod" structure with limited conformations and ability to adapt to the secondary structures of bio-molecules. Additionally, when cationic conjugated polymers are used as light-harvesting molecules, they can deleteriously exhibit fluorescence self-quenching when they cluster near negatively charged biomolecules.

There is a need in the art for novel CCPs, for methods of making and using them, and for compositions and articles of manufacture comprising such compounds.

SUMMARY OF THE INVENTION

Methods, compositions and articles of manufacture involving cationic conjugated conformationally flexible polymers are provided. A method for the synthesis of cationic water-soluble polymers with linkages along the polymer main chain structure which disrupt the ability of the polymers to form extended-rod structures is provided. Such polymers may serve in the fabrication of novel optoelectronic devices and in the development of highly efficient biosensors. The invention further relates to the application of these polymers in assay methods.

Advantageously, the methods allow for modification of the shape of the polymers and can provide the ability to control their emission properties. Cationic conjugated polymers are provided that can better adapt to the secondary structure of biological substrates, exhibit reduced chain packing and/or exhibit reduced self-quenching in solution. The polymers provided may emit at different wavelengths which may be useful in multiplexed homogenous or surface-bound biosensors.

DETAILED DESCRIPTION OF THE INVENTION

Figure 1:
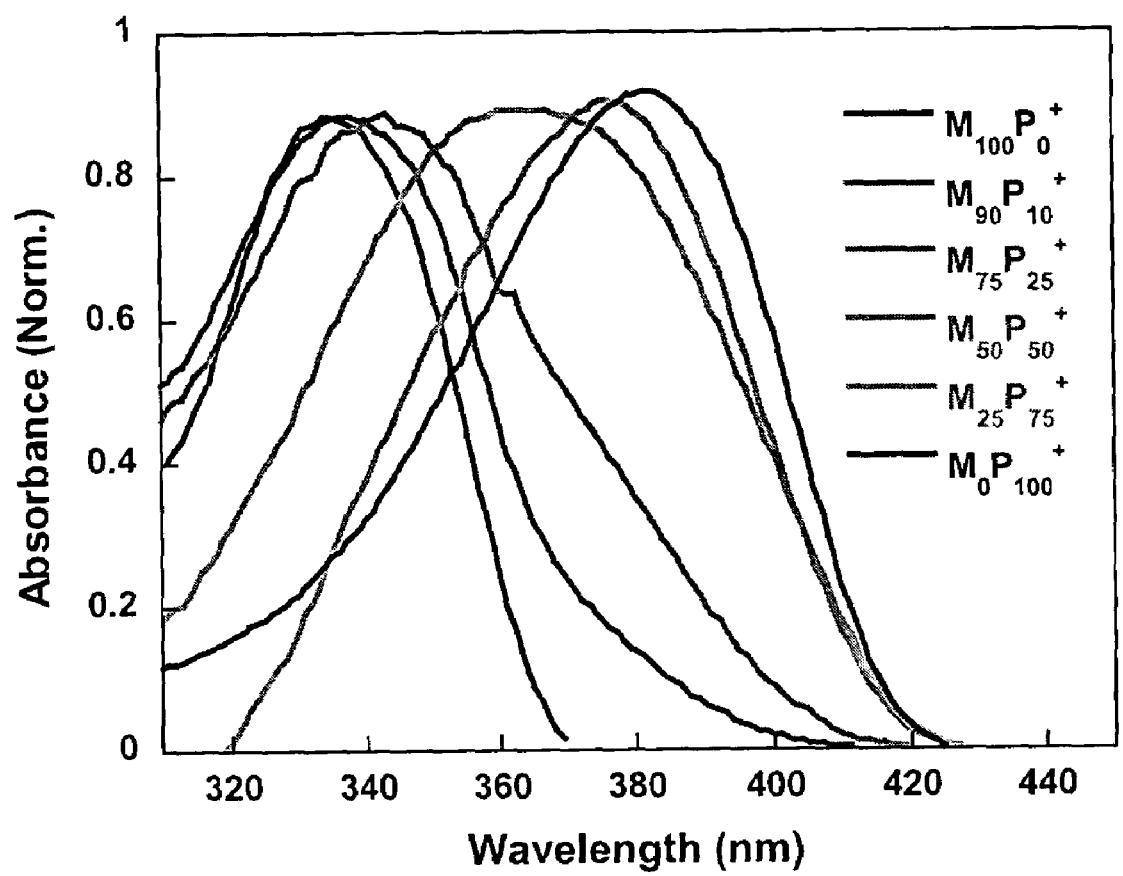
FIG. 1 shows the absorption spectra of cationic water-soluble polymers ($M_{100}P_0^+$, $M_{90}P_{10}^+$, $M_{75}P_{25}^+$, $M_{50}P_{50}^+$, $M_{25}P_{75}^+$, $M_0P_{100}^+$) in water.

The inventors have provided cationic conjugated polymers (CCPs) comprising monomers which perturb the polymer's ability to form rigid-rod structures, allowing them to form a greater range of three-dimensional structures. The monomers are aromatic molecules having attachment points to the adjacent subunits of the polymer which form an angle of greater than about 25°. The monomers may introduce a torsional twist in the conjugated polymer, thereby further disrupting the ability of the polymer to form a rigid-rod structure.

A synthetic method is also provided for producing CCPs with a range of backbone regiochemistries. Such CCPs exhibit facile energy transfer amongst polymer segments which results in similar emission properties and FRET function, despite structural differences which affect the average conjugation length. Furthermore, the flexible CCPs can be more efficient excitation donors with respect to particular biomolecules and under certain conditions these materials can show improved performance when used in bioassays that take advantage of the optical amplification of water-soluble conjugated polymers.

In one aspect, a plurality of CCPs with different structures are provided, which may be in the form of a library. The CCPs may be tested for any property of interest. Particular biological targets of interest can be tested against a plurality of different CCPs comprising such subunits to find particular CCPs with properties desirable for use with the target. For example, the CCPs may be tested for binding to the target and/or for energy transfer to the target, for increased fluorescent efficiency, for decreased self-quenching, increased Stoke's shift, and for emission wavelength.

Also provided are methods of use of the CCPs in bioassays for target biomolecules. The CCPs may be provided in solution and/or kit form, which may be adapted for performing specific assay methods. Sensing complexes and solutions comprising a CCP are also provided, as are detection complexes comprising a CCP, a sensor and a signaling chromophore. Articles of manufacture comprising the CCP are also provided. Other aspects of the invention are discussed further herein.

In one aspect, a method is provided comprising contacting a sample suspected of comprising a target with a solution comprising a flexible CCP, a sensor biomolecule, and a luminescent signaling chromophore. The CCP and the signaling chromophore (C*) are chosen so that the absorption bands of the two species have minimal overlap and so that the luminescent emission spectra of the two species are at different wavelengths. A detectable change in the emission of light with wavelength characteristic of the signaling chromophore indicates the presence of the target, which binds to the sensor and forms a detection complex, in the sample. By using multiple sensor biomolecules, each with a different binding specificity, multiple targets can be independently detected. An additional component such as a dye may be introduced to improve selectivity by further transferring energy from the signaling chromophore to the dye.

In addition to the described method, the invention provides a predominantly aqueous solution comprising a CCP, a "sensor biomolecule" and a signaling chromophore.

As demonstrated in the Examples, the optical amplification provided by a flexible CCP can be used to detect polynucleotide hybridization to a sensor polynucleotide. The amplification can be enhanced by using higher molecular weight water CCPs. The invention can be provided in a homogeneous format that utilizes the ease of fluorescence detection methods. The methods can be used to detect amplified target polynucleotides or, because of the large signal amplification, as a stand alone assay, without need for polynucleotide amplification.

The methods of the invention can all be performed in multiplex formats. A plurality of different sensor biomolecules can be used to detect corresponding different target biomolecules in a sample through the use of different signaling chromophores conjugated to the respective sensor biomolecules. Multiplex methods are provided employing 2, 3, 4, 5, 10, 15, 20, 25, 50, 100, 200, 400 or more different sensor biomolecules which can be used simultaneously to assay for corresponding different target biomolecules.

The methods can be performed on a substrate, as well as in solution, although the solution format is expected to be more rapid due to diffusion issues. Thus the assay can be performed, for example, in an array format on a substrate, which can be a biosensor. This can be achieved by anchoring or otherwise incorporating an assay component onto the substrate, for example the sensor biomolecule, the CCP, or both. These substrates may be surfaces of glass, silicon, paper, plastic, or the surfaces of optoelectronic semiconductors (such as, but not confined to, indium-doped gallium nitride or polymeric polyanilines, etc.) employed as optoelectronic transducers. The location of a given sensor biomolecule may be known or determinable in an array format, and the array format may be microaddressable or nanoaddressable. In one variation, one or more samples, which may contain an amplification product, can be attached to the substrate, and the substrate can be contacted with one or more labeled sensor biomolecules and the CCP.

Before the present invention is described in further detail, it is to be understood that this invention is not limited to the particular methodology, devices, solutions or apparatuses described, as such methods, devices, solutions or apparatuses can, of course, vary. It is also to be understood that the terminology used herein is for the purpose of describing particular embodiments only, and is not intended to limit the scope of the present invention.

Use of the singular forms "a," "an," and "the" include plural references unless the context clearly dictates otherwise. Thus, for example, reference to "a cationic conjugated polymer" includes a plurality of cationic conjugated polymers, reference to "a subunit" includes a plurality of such subunits, reference to "a sensor" includes a plurality of sensors, and the like. Additionally, use of specific plural references, such as "two," "three," etc., read on larger numbers of the same subject less the context clearly dictates otherwise.

Terms such as "connected," "attached," and "linked" are used interchangeably herein and encompass direct as well as indirect connection, attachment, linkage or conjugation unless the context clearly dictates otherwise. Where a range of values is recited, it is to be understood that each intervening integer value, and each fraction thereof, between the recited upper and lower limits of that range is also specifically disclosed, along with each subrange between such values. The upper and lower limits of any range can independently be included in or excluded from the range, and each range where either, neither or both limits are included is also encompassed within the invention. Where a value being discussed has inherent limits, for example where a component can be present at a concentration of from 0 to 100%, or where the pH of an aqueous solution can range from 1 to 14, those inherent limits are specifically disclosed. Where a value is explicitly recited, it is to be understood that values which are about the same quantity or amount as the recited value are also within the scope of the invention, as are ranges based thereon. Where a combination is disclosed, each subcombination of the elements of that combination is also specifically disclosed and is within the scope of the invention. Conversely, where different elements or groups of elements are disclosed, combinations thereof are also disclosed. Where any element of an invention is disclosed as having a plurality of alternatives, examples of that invention in which each alternative is excluded singly or in any combination with the other alternatives are also hereby disclosed; more than one element of an invention can have such exclusions, and all combinations of elements having such exclusions are hereby disclosed.

Unless defined otherwise or the context clearly dictates otherwise, all technical and scientific terms used herein have the same meaning as commonly understood by one of ordinary skill in the art to which this invention belongs. Although any methods and materials similar or equivalent to those described herein can be used in the practice or testing of the invention, the preferred methods and materials are now described.

All publications mentioned herein are hereby incorporated by reference for the purpose of disclosing and describing the particular materials and methodologies for which the reference was cited. The publications discussed herein are provided solely for their disclosure prior to the filing date of the present application. Nothing herein is to be construed as an admission that the invention is not entitled to antedate such disclosure by virtue of prior invention.

DEFINITIONS

In describing the present invention, the following terms will be employed, and are intended to be defined as indicated below.

"Alkyl" refers to a branched, unbranched or cyclic saturated hydrocarbon group of 1 to 24 carbon atoms optionally substituted at one or more positions, and includes polycyclic compounds. Examples of alkyl groups include optionally substituted methyl, ethyl, n-propyl, isopropyl, n-butyl, s-butyl, t-butyl, n-pentyl, isopentyl, neopentyl, n-hexyl, n-heptyl, n-octyl, n-decyl, hexyloctyl, tetradecyl, hexadecyl, eicosyl, tetracosyl and the like, as well as cycloalkyl groups such as cyclopropyl, cyclobutyl, cyclopentyl, cyclohexyl, cycloheptyl, cyclooctyl, adamantyl, and norbornyl. The term "lower alkyl" refers to an alkyl group of 1 to 6 carbon atoms, preferably 1 to 4 carbon atoms. Exemplary substituents on substituted alkyl groups include hydroxyl, cyano, alkoxy, $=O$, $=S$, $-NO_2$, halogen, haloalkyl, heteroalkyl, carboxyalkyl, amine, amide, thioether and $-SH$.

"Alkoxy" refers to an "-Oalkyl" group, where alkyl is as defined above. A "lower alkoxy" group intends an alkoxy group containing one to six, more preferably one to four, carbon atoms.

"Alkenyl" refers to a branched, unbranched or cyclic hydrocarbon group of 2 to 24 carbon atoms containing at least one carbon-carbon double bond optionally substituted at one or more positions. Examples of alkenyl groups include ethenyl, 1-propenyl, 2-propenyl (allyl), 1-methylvinyl, cyclopropenyl, 1-butenyl, 2-butenyl, isobutenyl, 1,4-butadienyl, cyclobutenyl, 1-methylbut-2-enyl, 2-methylbut-2-en-4-yl, prenyl, pent-1-enyl, pent-3-enyl, 1,1-dimethylallyl, cyclopentenyl, hex-2-enyl, 1-methyl-1-ethylallyl, cyclohexenyl, heptenyl, cycloheptenyl, octenyl, cyclooctenyl, decenyl, tetradecenyl, hexadecenyl, eicosenyl, tetracosenyl and the like. Preferred alkenyl groups herein contain 2 to 12 carbon atoms. The term "lower alkenyl" intends an alkenyl group of 2 to 6 carbon atoms, preferably 2 to 4 carbon atoms. The term "cycloalkenyl" intends a cyclic alkenyl group of 3 to 8, preferably 5 or 6, carbon atoms. Exemplary substituents on substituted alkenyl groups include hydroxyl, cyano, alkoxy, $=O$, $=S$, $-NO_2$, halogen, haloalkyl, heteroalkyl, amine, thioether and $-SH$.

"Alkenyloxy" refers to an "-Oalkenyl" group, wherein alkenyl is as defined above.

"Alkylaryl" refers to an alkyl group that is covalently joined to an aryl group. Preferably, the alkyl is a lower alkyl. Exemplary alkylaryl groups include benzyl, phenethyl, phenopropyl, 1-benzylethyl, phenobutyl, 2-benzylpropyl and the like.

"Alkylaryloxy" refers to an "-Oalkylaryl" group, where alkylaryl is as defined above.

"Alkynyl" refers to a branched or unbranched hydrocarbon group of 2 to 24 carbon atoms containing at least one $-C\equiv C-$ triple bond, optionally substituted at one or more positions. Examples of alkynyl groups include ethynyl, n-propynyl, isopropynyl, propargyl, but-2-ynyl, 3-methylbut-1-ynyl, octynyl, decynyl and the like. Preferred alkynyl groups herein contain 2 to 12 carbon atoms. The term "lower alkynyl" intends an alkynyl group of 2 to 6, preferably 2 to 4, carbon atoms, and one $-C\equiv C-$ triple bond. Exemplary substituents on substituted alkynyl groups include hydroxyl, cyano, alkoxy, $=O$, $=S$, $-NO_2$, halogen, haloalkyl, heteroalkyl, amine, thioether and $-SH$.

"Amide" refers to $-C(O)NR'R''$, where R' and R'' are independently selected from hydrogen, alkyl, aryl, and alkylaryl.

"Amine" refers to an $-N(R')R''$ group, where R' and R'' are independently selected from hydrogen, alkyl, aryl, and alkylaryl.

"Aryl" refers to an aromatic group that has at least one ring having a conjugated pi electron system and includes carbocyclic, heterocyclic, bridged and/or polycyclic aryl groups, and can be optionally substituted at one or more positions. Typical aryl groups contain 1 to 5 aromatic rings, which may be fused and/or linked. Exemplary aryl groups include phenyl, furanyl, azolyl, thiofuranyl, pyridyl, pyrimidyl, pyrazinyl, triazinyl, biphenyl, indenyl, benzofuranyl, indolyl, naphthyl, quinolinyl, isoquinolinyl, quinazolinyl, pyridopyridinyl, pyrrolopyridinyl, purinyl, tetralinyl and the like. Exemplary substituents on optionally substituted aryl groups include alkyl, alkoxy, alkylcarboxy, alkenyl, alkenyloxy, alkenylcarboxy, aryl, aryloxy, alkylaryl, alkylaryloxy, fused saturated or unsaturated optionally substituted rings, halogen, haloalkyl, heteroalkyl, $-S(O)R$, sulfonyl, $-SO_3R$, $-SR$, $-NO_2$, $-NRR'$, $-OH$, $-CN$, $-C(O)R$, $-OC(O)R$, $-NHC(O)R$, $-(CH_2)_nCO_2R$ or $-(CH_2)_n CONRR'$ where n is 0–4, and wherein R and R' are independently H, alkyl, aryl or alkylaryl.

"Aryloxy" refers to an "-Oaryl" group, where aryl is as defined above.

"Carbocyclic" refers to an optionally substituted compound containing at least one ring and wherein all ring atoms are carbon, and can be saturated or unsaturated.

"Carbocyclic aryl" refers to an optionally substituted aryl group wherein the ring atoms are carbon.

"Halo" or "halogen" refers to fluoro, chloro, bromo or iodo. "Halide" refers to the anionic form of the halogens.

"Haloalkyl" refers to an alkyl group substituted at one or more positions with a halogen, and includes alkyl groups substituted with only one type of halogen atom as well as alkyl groups substituted with a mixture of different types of halogen atoms. Exemplary haloalkyl groups include trihalomethyl groups, for example trifluoromethyl.

"Heteroalkyl" refers to an alkyl group wherein one or more carbon atoms and associated hydrogen atom(s) are replaced by an optionally substituted heteroatom, and includes alkyl groups substituted with only one type of heteroatom as well as alkyl groups substituted with a mixture of different types of heteroatoms. Heteroatoms include oxygen, sulfur, and nitrogen. As used herein, nitrogen heteroatoms and sulfur heteroatoms include any oxidized form of nitrogen and sulfur, and any form of nitrogen having four covalent bonds including protonated forms. An optionally substituted heteroatom refers to replacement of one or more hydrogens attached to a nitrogen atom with alkyl, aryl, alkylaryl or hydroxyl.

"Heterocyclic" refers to a compound containing at least one saturated or unsaturated ring having at least one heteroatom and optionally substituted at one or more positions. Typical heterocyclic groups contain 1 to 5 rings, which may be fused and/or linked, where the rings each contain five or six atoms. Examples of heterocyclic groups include piperidinyl, morpholinyl and pyrrolidinyl. Exemplary substituents for optionally substituted heterocyclic groups are as for alkyl and aryl at ring carbons and as for heteroalkyl at heteroatoms.

"Heterocyclic aryl" refers to an aryl group having at least 1 heteroatom in at least one aromatic ring. Exemplary heterocyclic aryl groups include furanyl, thienyl, pyridyl, pyridazinyl, pyrrolyl, N-lower alkyl-pyrrolo, pyrimidyl, pyrazinyl, triazinyl, tetrazinyl, triazolyl, tetrazolyl, imidazolyl, bipyridyl, tripyridyl, tetrapyridyl, phenazinyl, phenanthrolinyl, purinyl and the like.

"Hydrocarbyl" refers to hydrocarbyl substituents containing 1 to about 20 carbon atoms, including branched, unbranched and cyclic species as well as saturated and unsaturated species, for example alkyl groups, alkylidenyl groups, alkenyl groups, alkylaryl groups, aryl groups, and the like. The term "lower hydrocarbyl" intends a hydrocarbyl group of one to six carbon atoms, preferably one to four carbon atoms.

A "substituent" refers to a group that replaces one or more hydrogens attached to a carbon or nitrogen. Exemplary substituents include alkyl, alkylidenyl, alkylcarboxy, alkoxy, alkenyl, alkenylcarboxy, alkenyloxy, aryl, aryloxy, alkylaryl, alkylaryloxy, —OH, amide, carboxamide, carboxy, sulfonyl, =O, =S, —NO$_2$, halogen, haloalkyl, fused saturated or unsaturated optionally substituted rings, —S(O)R, —SO$_3$R, —SR, —NRR', —OH, —CN, —C(O)R, —OC(O)R, —NHC(O)R, —(CH2)$_n$CO$_2$R or —(CH2)$_n$CONRR' where n is 0–4, and wherein R and R' are independently H, alkyl, aryl or alkylaryl. Substituents also include replacement of a carbon atom and one or more associated hydrogen atoms with an optionally substituted heteroatom.

"Sulfonyl" refers to —S(O)$_2$R, where R is alkyl, aryl, —C(CN)=C—aryl, —CH$_2$CN, alkylaryl, or amine.

"Thioamide" refers to —C(S)NR'R", where R' and R" are independently selected from hydrogen, alkyl, aryl, and alkylaryl.

"Thioether" refers to —SR, where R is alkyl, aryl, or alkylaryl.

The term "antibody" as used herein includes antibodies obtained from both polyclonal and monoclonal preparations, as well as: hybrid (chimeric) antibody molecules (see, for example, Winter et al. (1991) Nature 349:293–299; and U.S. Pat. No. 4,816,567); F(ab')2 and F(ab) fragments; Fv molecules (noncovalent heterodimers, see, for example, Inbar et al. (1972) Proc Natl Acad Sci USA 69:2659–2662; and Ehrlich et al. (1980) Biochem 19:4091–4096; single-chain Fv molecules (sFv) (see, for example, Huston et al. (1988) Proc Nati Acad Sci USA 85:5879–5883); dimeric and trimeric antibody fragment constructs; minibodies (see, e.g., Pack et al. (1992) Biochem 31:1579–1584; Cumber et al. (1992) J Immunology 149B: 120–126); humanized antibody molecules (see, for example, Riechmann et al. (1988) Nature 332:323–327; Verhoeyan et al. (1988) Science 239:1534–1536; and U.K. Patent Publication No. GB 2,276, 169, published 21 Sep. 1994); and, any functional fragments obtained from such molecules, wherein such fragments retain specific-binding properties of the parent antibody molecule.

As used herein, the term "monoclonal antibody" refers to an antibody composition having a homogeneous antibody population. The term is not limited regarding the species or source of the antibody, nor is it intended to be limited by the manner in which it is made. Thus, the term encompasses antibodies obtained from murine hybridomas, as well as human monoclonal antibodies obtained using human hybridomas or from murine hybridomas made from mice expression human immunoglobulin chain genes or portions thereof. See, e.g., Cote, et al. Monoclonal Antibodies and Cancer Therapy, Alan R. Liss, 1985, p. 77.

The terms "polynucleotide," "oligonucleotide," "nucleic acid" and "nucleic acid molecule" are used interchangeably herein to refer to a polymeric form of nucleotides of any length, and may comprise ribonucleotides, deoxyribonucleotides, analogs thereof, or mixtures thereof. These terms refer only to the primary structure of the molecule. Thus, the terms includes triple-, double- and single-stranded deoxyribonucleic acid ("DNA"), as well as triple-, double- and single-stranded ribonucleic acid ("RNA"). It also includes modified, for example by alkylation, and/or by capping, and unmodified forms of the polynucleotide.

Whether modified or unmodified, when a polynucleotide is used as a sensor molecule in methods as described herein, the sensor polynucleotide can be anionic (e.g., RNA or DNA), or the sensor polynucleotide may have an uncharged backbone (e.g., PNA). The target polynucleotide can in principle be charged or uncharged, although typically it is expected to be anionic, for example RNA or DNA.

More particularly, the terms "polynucleotide," "oligonucleotide," "nucleic acid" and "nucleic acid molecule" include polydeoxyribonucleotides (containing 2-deoxy-D-ribose), polyribonucleotides (containing D-ribose), including tRNA, rRNA, hRNA, and mRNA, whether spliced or unspliced, any other type of polynucleotide which is an N- or C-glycoside of a purine or pyrimidine base, and other polymers containing a phosphate or other polyanionic backbone, and other synthetic sequence-specific nucleic acid polymers providing that the polymers contain nucleobases in a configuration which allows for base pairing and base stacking, such as is found in DNA and RNA. There is no intended distinction in length between the terms "polynucleotide," "oligonucleotide," "nucleic acid" and "nucleic acid molecule," and these terms are used interchangeably herein. These terms refer only to the primary structure of the molecule. Thus, these terms include, for example, 3'-deoxy-2',5'-DNA, oligodeoxyribonucleotide N3' P5' phosphoramidates, 2'-O-alkyl-substituted RNA, double- and single-stranded DNA, as well as double- and single-stranded RNA, and hybrids thereof including for example hybrids between DNA and RNA, and also include known types of modifications, for example, labels, alkylation, "caps," substitution of one or more of the nucleotides with an analog, internucleotide modifications such as, for example, those with negatively charged linkages (e.g., phosphorothioates, phosphorodithioates, etc.), those containing pendant moieties, such as, for example, proteins (including enzymes (e.g. nucleases), toxins, antibodies, signal peptides, poly-L-lysine, etc.), those with intercalators (e.g., acridine, psoralen, etc.), those containing chelates (of, e.g., metals, radioactive metals, boron, oxidative metals, etc.), those containing alkylators, those with modified linkages (e.g., alpha anomeric nucleic acids, etc.), as well as unmodified forms of the polynucleotide or oligonucleotide.

It will be appreciated that, as used herein, the terms "nucleoside" and "nucleotide" will include those moieties which contain not only the known purine and pyrimidine bases, but also other heterocyclic bases which have been modified. Such modifications include methylated purines or pyrimidines, acylated purines or pyrimidines, or other heterocycles. Modified nucleosides or nucleotides can also include modifications on the sugar moiety, e.g., wherein one or more of the hydroxyl groups are replaced with halogen, aliphatic groups, or are functionalized as ethers, amines, or the like. The term "nucleotidic unit" is intended to encompass nucleosides and nucleotides.

Furthermore, modifications to nucleotidic units include rearranging, appending, substituting for or otherwise altering functional groups on the purine or pyrimidine base which form hydrogen bonds to a respective complementary pyrimidine or purine. The resultant modified nucleotidic unit optionally may form a base pair with other such modified nucleotidic units but not with A, T, C, G or U. Abasic sites may be incorporated which do not prevent the function of the polynucleotide; preferably the polynucleotide does not comprise abasic sites. Some or all of the residues in the polynucleotide can optionally be modified in one or more ways.

Standard A-T and G-C base pairs form under conditions which allow the formation of hydrogen bonds between the N3-H and C4-oxy of thymidine and the N1 and C6-NH$_2$, respectively, of adenosine and between the C2-oxy, N3 and C4-NH$_2$, of cytidine and the C2-NH$_2$, N'—H and C6-oxy, respectively, of guanosine. Thus, for example, guanosine (2-amino-6-oxy-9-β-D-ribofuranosyl-purine) may be modified to form isoguanosine (2-oxy-6-amino-9-β-D-ribofuranosyl-purine). Such modification results in a nucleoside base which will no longer effectively form a standard base pair with cytosine. However, modification of cytosine (1-β-D-ribofuranosyl-2-oxy-4-amino-pyrimidine) to form isocytosine (1-β-D-ribofuranosyl-2-amino-4-oxy-pyrimidine) results in a modified nucleotide which will not effectively base pair with guanosine but will form a base pair with isoguanosine. Isocytosine is available from Sigma Chemical Co. (St. Louis, Mo.); isocytidine may be prepared by the method described by Switzer et al. (1993) Biochemistry 32:10489–10496 and references cited therein; 2'-deoxy-5-methyl-isocytidine may be prepared by the method of Tor et al. (1993) J. Am. Chem. Soc. 115:4461–4467 and references cited therein; and isoguanine nucleotides may be prepared using the method described by Switzer et al. (1993), supra, and Mantsch et al. (1993) Biochem. 14:5593–5601, or by the method described in U.S. Pat. No. 5,780,610 to Collins et al. Other nonnatural base pairs may be synthesized by the method described in Piccirilli et al. (1990) Nature 343: 33–37 for the synthesis of 2,6-diaminopyrimidine and its complement (1-methylpyrazolo-[4,3]pyrimidine-5,7-(4H, 6H)-dione). Other such modified nucleotidic units which form unique base pairs are known, such as those described in Leach et al. (1992) J. Am. Chem. Soc. 114:3675–3683 and Switzer et al., supra.

"Preferential binding" or "preferential hybridization" refers to the increased propensity of one biomolecule to bind to a binding partner in a sample as compared to another component of the sample.

Hybridization conditions will typically include salt concentrations of less than about 1M, more usually less than about 500 mM and preferably less than about 200 mM. In the case of hybridization between a peptide nucleic acid and a polynucleotide, the hybridization can be done in solutions containing little or no salt. Hybridization temperatures can be as low as 5° C., but are typically greater than 22° C., more typically greater than about 30° C., and preferably in excess of about 37° C. Longer fragments may require higher hybridization temperatures for specific hybridization. Other factors may affect the stringency of hybridization, including base composition and length of the complementary strands, presence of organic solvents and extent of base mismatching, and the combination of parameters used is more important than the absolute measure of any one alone. Suitable hybridization conditions for a given assay format can be determined by one of skill in the art; nonlimiting parameters which may be adjusted include concentrations of assay components, salts used and their concentration, ionic strength, temperature, buffer type and concentration, solution pH, presence and concentration of blocking reagents to decrease background binding such as repeat sequences or blocking protein solutions, detergent type(s) and concentrations, molecules such as polymers which increase the relative concentration of the polynucleotides, metal ion(s) and their concentration(s), chelator(s) and their concentrations, and other conditions known in the art.

"Polypeptide" and "protein" are used interchangeably herein and include a molecular chain of amino acids linked through peptide bonds. The terms do not refer to a specific length of the product. Thus, "peptides," "oligopeptides," and "proteins" are included within the definition of polypeptide. The terms include polypeptides containing modifications of the polypeptide, for example, glycosylations, acetylations, phosphorylations, and sulphations. In addition, protein fragments, analogs (including amino acids not encoded by the genetic code, e.g. homocysteine, ornithine, D-amino acids, and creatine), natural or artificial mutants or variants or combinations thereof, fusion proteins, and proteins comprising derivatized residues (e.g. alkylation of amine groups, acetylations or others esterifications of carboxyl groups) and the like are included within the meaning of polypeptide.

"Multiplexing" herein refers to an assay or other analytical method in which multiple analytes can be assayed simultaneously.

"Optional" or "optionally" means that the subsequently described event or circumstance may or may not occur, and that the description includes instances where said event or circumstance occurs singly or multiply and instances where it does not occur at all. For example, the phrase "optionally substituted alkyl" means an alkyl moiety that may or may not be substituted and the description includes both unsubstituted, monosubstituted, and polysubstituted alkyls.

The Conformationally Flexible Polymer

The inventors have provided conformationally flexible cationic conjugated polymers (CCPs) comprising angled linkers with a substitution pattern (or regiochemistry) capable of perturbing the polymers' ability to form rigid-rod structures, allowing the CCPs to have a greater range of three-dimensional structures. The CCPs comprise at least three subunits with at least one angled linker, which may be internal and/or an end unit, and may comprise at least 4, 5, 6, 8, 10, 15, 20, 25 or more subunits. The CCPs may comprise up to about 100, 200, 300, 500, 1000, 2000, 5000, 10000, 20000, 50000 or more subunits.

The angled linker(s) are optionally substituted aromatic molecules having at least two separate bonds to other polymer components (e.g., monomers, block polymers, end groups) that are capable of forming angles relative to one another which disrupt the overall ability of the polymer to form an extended rigid-rod structure (although significant regions exhibiting such structure may remain.) The angled linkers may be bivalent or polyvalent.

The angle which the angled linkers are capable of imparting to the polymeric structure is determined as follows. Where the two bonds to other polymeric components are coplanar, the angle can be determined by extending lines representing those bonds to the point at which they intersect, and then measuring the angle between them. Where the two bonds to other polymeric components are not coplanar, the angle can be determined as follows: a first line is drawn between the two ring atoms to which the bonds attach; two bond lines are drawn, one extending from each ring atom in the direction of its respective bond to the other polymeric component to which it is joined; the angle between each bond line and the first line is fixed; and the two ring atoms are then merged into a single point by shrinking the first line to a zero length; the angle then resulting between the two bond lines is the angle the angled linker imparts to the CCP.

The angle which an angled linker is capable of imparting to the polymer is typically less than about 155°, and may be less than about 150°, less than about 145°, less than about 140°, less than about 135°, less than about 130°, less than about 125°, less than about 120°, less than about 115°, less than about 110°, less than about 105°, less than about 100°, less than about 95°, less than about 90°, less than about 85°, less than about 80°, less than about 75°, less than about 70°, less than about 65°, less than about 60°, less than about 55°, or less than about 50°. The angled linker may form an angle to its adjacent polymeric units of about 25°, 30°, 35°, 40°, 45°, 50°, 60° or more. The angled linker may introduce a torsional twist in the conjugated polymer, thereby further disrupting the ability of the polymer to form a rigid-rod structure. For angled linkers having an internally rotatable bond, such as polysubstituted biphenyl, the angled linker must be capable of imparting an angle of less than about 155° in at least one orientation.

For six-membered rings, such angles can be achieved through ortho or meta linkages to the rest of the polymer. For five-membered rings, adjacent linkages fall within this range. For eight-membered rings, linkages extending from adjacent ring atoms, from alternate ring atoms (separated by one ring atom), and from ring atoms separated by two other ring atoms fall within this range. Ring systems with more than eight ring atoms may be used. For polycyclic structures, even more diverse linkage angles can be achieved.

Exemplary linking units which meet these limitations include benzene derivatives incorporated into the polymer in the 1,2 or 1,3-positions; naphthalene derivatives incorporated into the polymer in the 1,2-, 1,3-, 1,6-, 1,7-, 1,8- positions; anthracene derivatives incorporated into the polymer in the 1,2-, 1,3-, 1,6-, 1,7-, 1,8-, and 1,9-positions; biphenyl derivatives incorporated into the polymer in the 2,3-, 2,4-, 2,6-, 3,3'-, 3,4-, 3,5-, 2,2'-, 2,3'-, 2,4'-, and 3,4'-positions; and corresponding heterocycles. The position numbers are given with reference to unsubstituted carbon-based rings, but the same relative positions of incorporation in the polymer are encompassed in substituted rings and/or heterocycles should their distribution of substituents change the ring numbering.

The CCP preferably contains at least about 0.01 mol % of the angled linker, and may contain at least about 0.02 mol %, at least about 0.05 mol %, at least about 0.1 mol %, at least about 0.2 mol %, at least about 0.5 mol %, at least about 1 mol %, at least about 2 mol %, at least about 5 mol %, at least about 10 mol %, at least about 20 mol %, or at least about 30 mol %. The CCP may contain up to 100 mol % of the angled linker, and may contain about 99 mol % or less, about 90 mol % or less, about 80 mol % or less, about 70 mol % or less, about 60 mol % or less, about 50 mol % or less, or about 40 mol % or less.

The CCP can be a copolymer, and may be a block copolymer, a graft copolymer, or both. The angled linker may be incorporated into the CCP randomly, alternately, periodically and/or in blocks. In one aspect, the angled linker can be selected from aromatic or heteroaromatic structures in which the shortest link between the linking points to the polymer involves an even number of atoms bonded to one another.

Light harvesting CCPs can efficiently transfer energy to nearby luminescent species (e.g., "signaling chromophores"). Mechanisms for energy transfer include, for example, resonant energy transfer (Förster (or fluorescence) resonance energy transfer, FRET), quantum charge exchange (Dexter energy transfer) and the like. Typically, however, these energy transfer mechanisms are relatively short range; that is, close proximity of the CCP to the signaling chromophore is required for efficient energy transfer.

The CCPs of the present invention may desirably provide a higher quantum yield and/or an increase in energy transfer to fluorescently-labeled double-stranded DNA in comparison to a copolymer of poly[9,9-bis(6'-N,N,N-trimethylammonium)hexylfluorene-co-1,4-phenylene] dibromide. Thus, the CCPs may provide at least a two-fold increase in energy transfer to labeled dsDNA, and may provide a three-fold or higher increase in energy transfer to labeled dsDNA.

The CCPs are polycationic, and any or all of the subunits of the polymer may comprise one or more cationic groups, including the angled linker(s). Any suitable cationic groups may be incorporated into the CCPs. Exemplary cationic groups which may be incorporated include ammonium groups, guanidinium groups, histidines, polyamines, pyridinium groups, and sulfonium groups.

Desirably, the CCPs described herein are soluble in aqueous solutions and other polar solvents, and preferably are soluble in water. By "water-soluble" is meant that the material exhibits solubility in a predominantly aqueous solution, which, although comprising more than 50% by volume of water, does not exclude other substances from that solution, including without limitation buffers, blocking agents, cosolvents, salts, metal ions and detergents.

In one embodiment, an exemplary CCP is represented by Formula A:

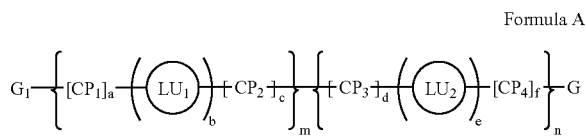

Formula A wherein:

$CP_1$, $CP_2$, $CP_3$, and $CP_4$ are optionally substituted conjugated polymer segments or oligomeric structures, and may be the same or different from one another. $CP_1$, $CP_2$, $CP_3$, and $CP_4$ may be aromatic repeat units, and may be selected from the group consisting of benzene, naphthalene, anthracene, fluorene, thiophene, furan, pyridine, and oxadiazole, each optionally substituted. Typical aromatic repeat units are shown in Table 1 below, and representative polymeric segments and oligomeric structures are shown in Table 2.

The formula contains linker units $LU_1$ and $LU_2$ which are angled linkers as described above, and can be mono- or polycyclic optionally substituted aryl groups having 5 to 20 atoms. The linker units may be evenly or randomly distributed along the polymer main chain. Particularly suitable aromatic rings are those which also produce a spatial twist of the polymer main chain, preventing the conjugated polymer from forming a plane across that linker unit.

$CP_1$, $CP_2$, $CP_3$, $CP_4$, $LU_1$ and $LU_2$ are each optionally substituted at one or more positions with one or more groups selected from —$R_1$-A, —$R_2$—B, —$R_3$—C and —$R_4$-D, which may be attached through bridging functional groups -E- and —F—, with the proviso that the polymer as a whole must be substituted with a plurality of cationic groups.

$R_1$, $R_2$, $R_3$ and $R_4$ are independently selected from alkyl, alkenyl, alkoxy, alkynyl, and aryl, alkylaryl, arylalkyl, and polyalkylene oxide, each optionally substituted, which may contain one or more heteroatoms, or may be not present. $R_1$, $R_2$, $R_3$ and $R_4$ can be independently selected from $C_{1-22}$ alkyl, $C_{1-22}$ alkoxy, $C_{1-22}$ ester, polyalkylene oxide having from 1 to about 22 carbon atoms, cyclic crown ether having from 1 to about 22 carbon atoms, or not present. Preferably, $R_1$, $R_2$, $R_3$ and $R_4$ may be selected from straight or branched alkyl groups having 1 to about 12 carbon atoms, or alkoxy groups with 1 to about 12 carbon atoms. It is to be understood that more than one functional group may be appended to the rings as indicated in the formulas at one or more positions.

A, B, C and D are independently selected from H, —SiR'R"R'", —$N^+$R'R"R'", a guanidinium group, histidine, a polyamine, a pyridinium group, and a sulfonium group. R', R" and R'" are independently selected from the group consisting of hydrogen, $C_{1-12}$ alkyl and $C_{1-12}$ alkoxy and $C_{3-10}$ cycloalkyl. It is preferred that R', R" and R'" are lower alkyl or lower alkoxy groups.

E and F are independently selected from not present, —O—, —S—, —C(O)—, —C(O)O—, —C(R)(R')—, —N(R')—, and —Si(R')(R"), wherein R' and R" are as defined above.

X is O, S, Se, —N(R')— or —C(R')(R")—, and Y and Z are independently selected from —C(R)═ and —N═, where R, R' and R" are as defined above.

m and n are independently 0 to about 10,000, wherein m+n>1. Preferably m and n are each independently 0 to about 20 and more preferably from 0 to about 10. Each repeat of m and n may be the same as or different than the other repeats thereof.

b and e are independently 0 to about 250, wherein b+e>1.

a, c, d and f are independently 0 to about 250.

G and G1 are capping units and may be the same or different. The capping units may be activated units that allow further chemical reaction to extend the polymer chain, or may be nonactivated termination units. G and G1 can be independently selected from hydrogen, optionally substituted aryl, halogen substituted aryl, boronic acid substituted aryl, and boronate radical substituted aryl.

TABLE 1

Typical aromatic repeat units for the construction of conjugated segments and oligomeric structures.

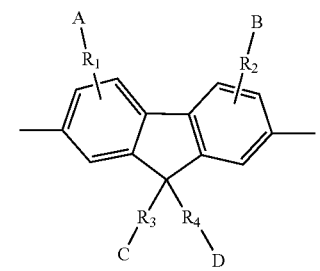

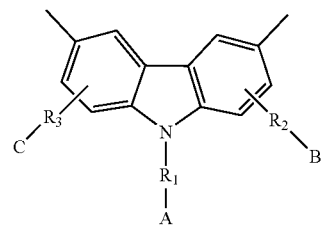

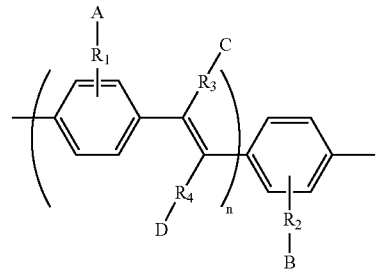

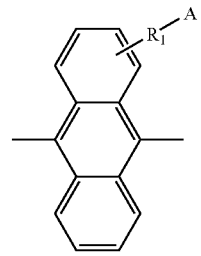

TABLE 1-continued
Typical aromatic repeat units for the construction of conjugated segments and oligomeric structures.
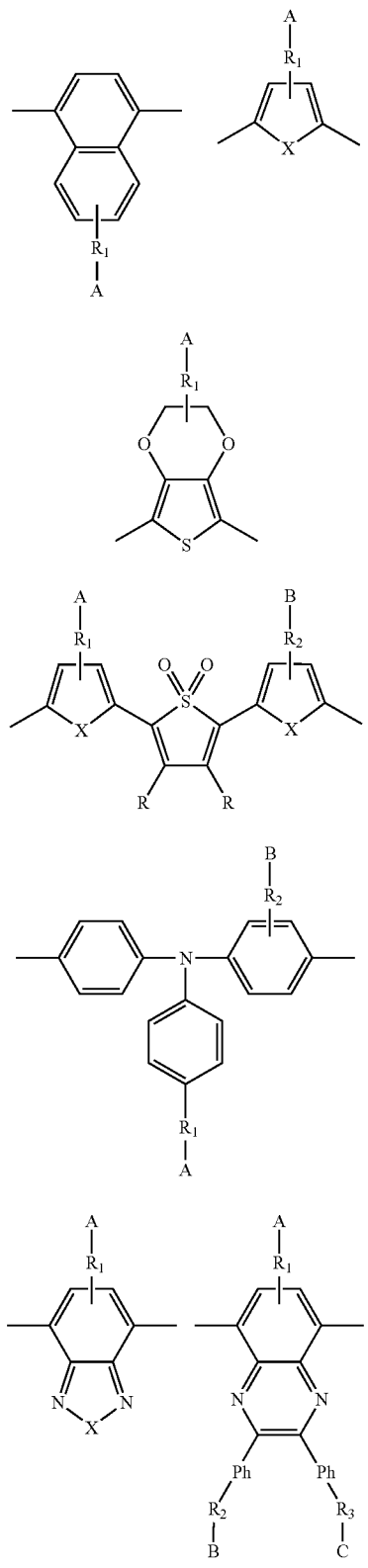
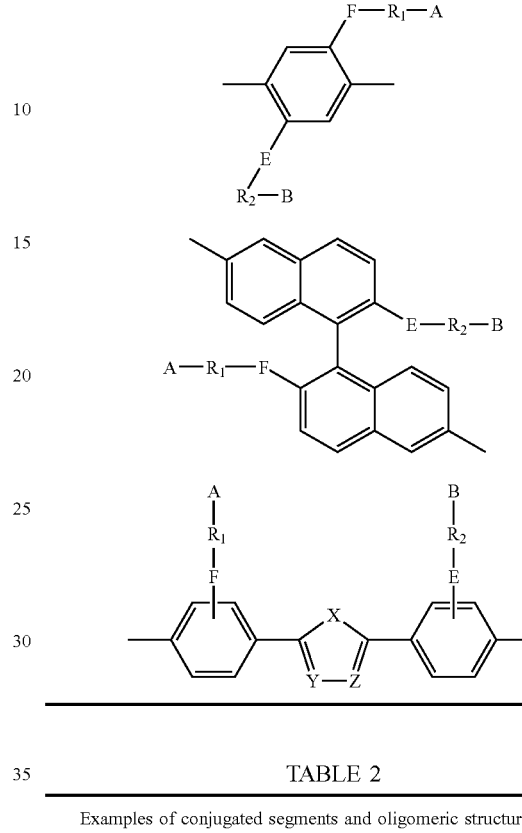
TABLE 2
Examples of conjugated segments and oligomeric structures of CP
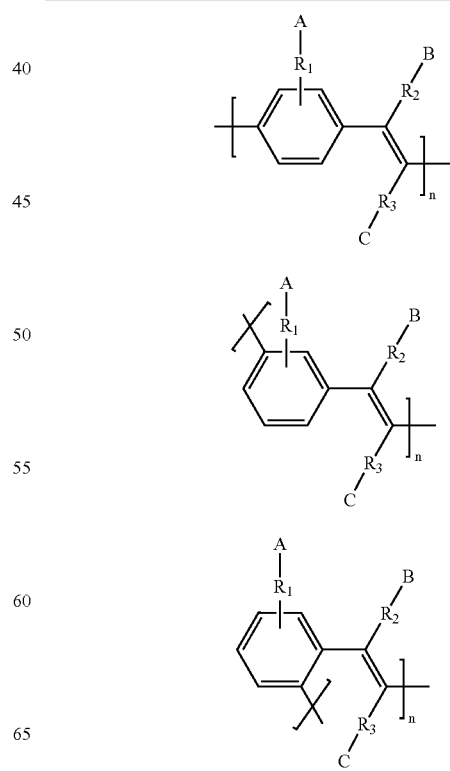

TABLE 2-continued
Examples of conjugated segments and oligomeric structures of CP
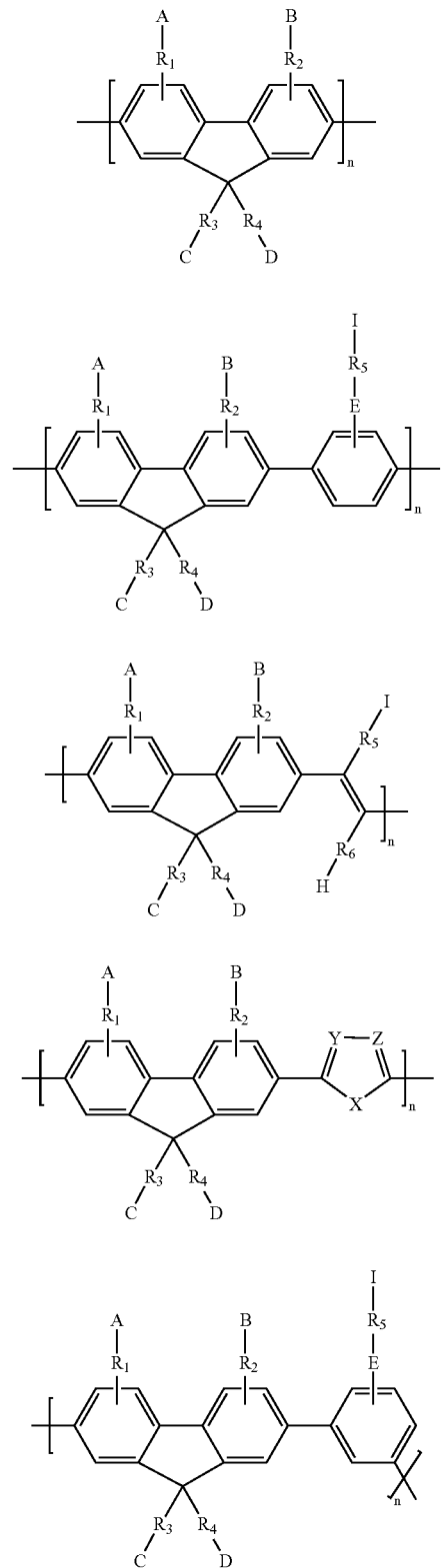
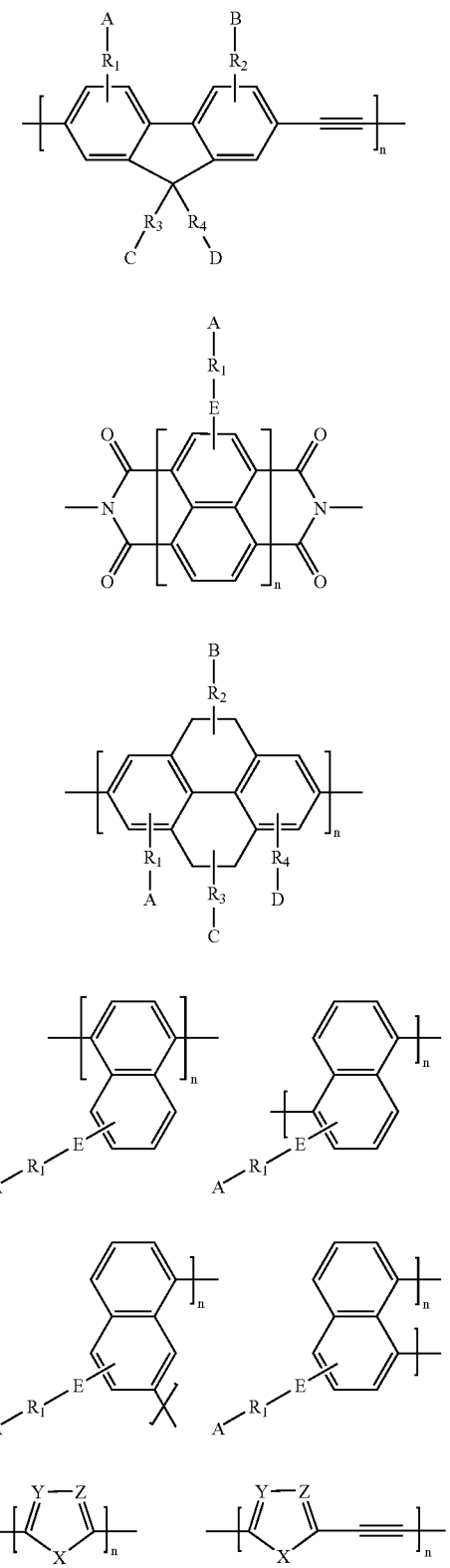

TABLE 2-continued

Examples of conjugated segments and oligomeric structures of CP

TABLE 2-continued
Examples of conjugated segments and oligomeric structures of CP
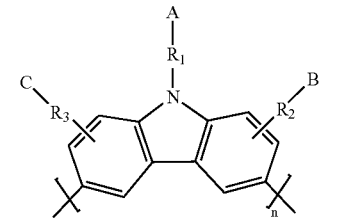
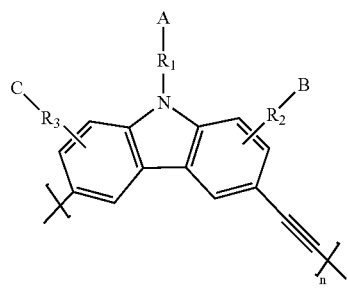
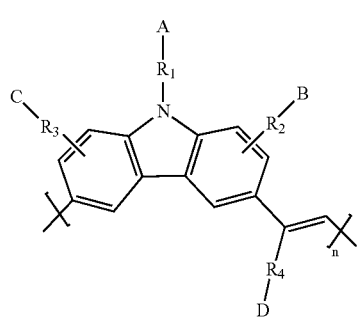
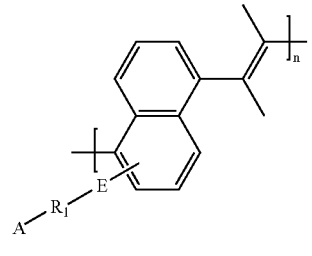
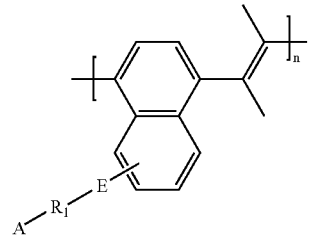
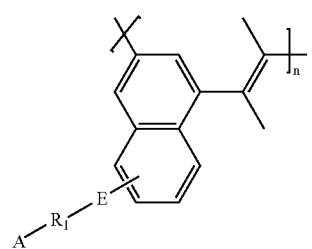
TABLE 2-continued
Examples of conjugated segments and oligomeric structures of CP
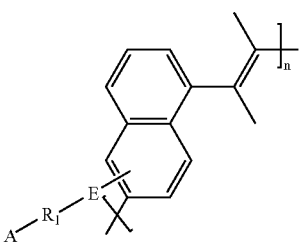
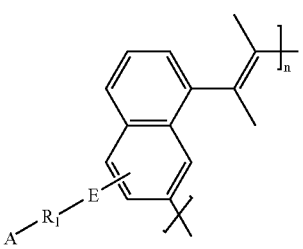
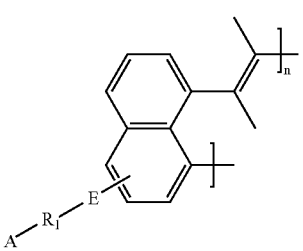
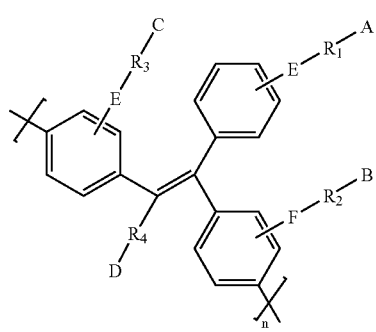
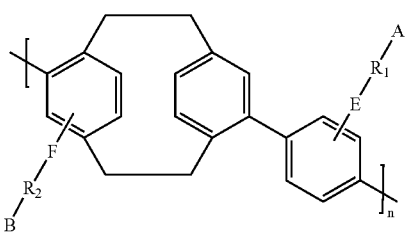
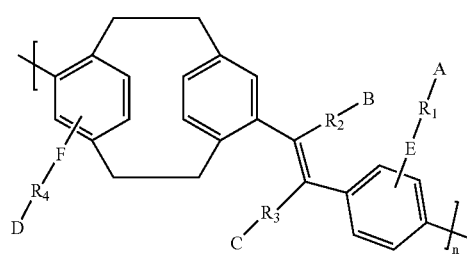

TABLE 2-continued

Examples of conjugated segments and oligomeric structures of CP

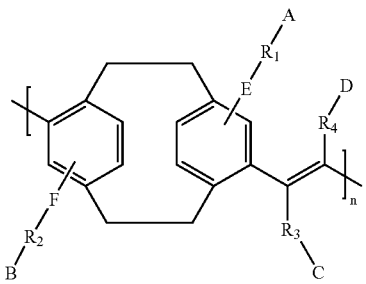

In one embodiment, modification of polymer shape was achieved through fractional incorporation of meta and para linkages on phenylene units adjacent to the fluorenyl monomer units. The meta/para ratio is controlled during the polymerization reaction by using of 1,3-phenylenebisboronic acid and 1,4-phenylenebisboronic acid in appropriate ratios. The corresponding polymers may have ratios of meta t6para linkages ranging from 0 to 100%. The introduction of the meta linkage not only permits shape control, but also provides the possibility of energy transfer along the polymer main chain, or between different polymer segments, since fragments containing a higher fraction ofpara linkages are of lower energy level, and behave as low energy traps. The synthetic approach is as follows. A neutral polymer is first formed by the Suzuki coupling of a targeted ratio of 1,3-phenylenebisboronic acid and 1,4-phenylenebisboronic acid with 2,7-dibromo-9,9-bis(6'-bromohexyl)fluorene. Conversion to cationic water-soluble polymers is accomplished by addition of condensed trimethylamine. See the examples provided below.

Articles of Manufacture

The CCPs can be incorporated into any of various articles of manufacture including optoelectronic or electronic devices, biosensors, photodiodes, light-emitting diodes ("LEDs"), optoelectronic semiconductor chips, semiconductor thin-films, and chips, and can be used in microarray form. The polymer can be incorporated into a polymeric photoswitch. The polymer can be incorporated into an optical interconnect or a transducer to convert a light signal to an electrical impulse. The CCPs can serve as liquid crystal materials. The CCPs, which provide an increased Stoke's shift resulting from inter- and intramolecular energy transfer, can serve as lasing materials. Flexible CCPs with decreased self-quenching can be used in optoelectronic devices which require more intense emission.

The polymer can be incorporated into articles of manufacture by any suitable technique, including by spin-coating, sequential spin-casting, formation of Langmuir-Blodgett films or electrostatic adsorption techniques.[8] Articles may be fabricated by stepwise deposition of polyelectrolyte layers; the water solubility of certain flexible CCPs provided herein allows for the sequential deposition of layers of different materials with different solubilities, providing certain advantages during manufacturing, including for the deposition of thin layers of material.

Methods of Use of the Conformationally Flexible Polymers

The CCPs may be used in methods which screen the CCPs for any property of interest. For example, the CCPs may be tested for binding to a target, for energy transfer to a chromophore, for increased fluorescent efficiency, for decreased self-quenching, for absorbance wavelength, and/ or for emission wavelength. Particular targets of interest, which include biomaterials and chemical compounds, can be tested against a plurality of different CCPs comprising such angled linkers to find particular CCPs with properties desirable for use with a given target.

A sensor molecule that is specific for the target may be used in conjugation with the CCP, as can a signaling chromophore to which energy may be transferred from the CCP. The CCP preferably interacts with the target and/or the sensor through electrostatic interactions. Preferably, a sensor of known structure is used to determine the presence and/or amount of the target in the sample. The sensor may provide a signal specific to its complementary target in any of various ways, including through incorporation of a specific signaling chromophore which can receive energy from the CCP, or through a defined and/or determinable position on a substrate. The signaling chromophore may be incorporated into the sensor, into a substrate, or may be recruited to a complex formed from the sensor and the target. Formation of such a complex results in an increase of energy transfer from a CCP upon excitation to the signaling chromophore, which may be detected directly or indirectly to provide information regarding the target.

Any target molecule and any sensor molecule that can bind to each other can in principle be used, with the proviso that the CCP must bind to or otherwise associate with at least one member of that binding pair or the complex they form; this may be accomplished through electrostatic interaction with negatively charged groups thereon, or by physical proximity by incorporation into a device such as a sensor which also binds to or is associated with one or more members of the complex thereby bringing the CCP into signaling juxtaposition to the signaling chromophore.

The target molecule may be a biomolecule, for example a peptide or protein, a polynucleotide such as DNA or RNA, and an antibody. The target may be a chemical compound, and the CCPs may be incorporated into chemical sensors to detect any species of interest, for example an explosive, e.g. trinitrotoluene.

Similarly, exemplary sensor molecules include chemical compounds and biomolecules. Exemplary sensor biomolecules include a polynucleotide with an anionic backbone such as DNA or RNA, a polynucleotide with an uncharged backbone such as a peptide nucleic acid (PNA), an antibody, and a peptide or protein, which may be a polynucleotide-binding protein (PBP).

When the sensor biomolecule is a polynucleotide, the sensor polynucleotide can be branched, multimeric or circular, but is typically linear, and can contain nonnatural bases. Sensor polynucleotides can be prepared with any desired sequence of bases. Chemical methods for attaching a signaling chromophore to sensor biomolecules are known in the art.[9] Specific sensor polynucleotide structures, including structures conjugated to chromophores, can be custom-made using commercial sources or chemically synthesized.

Any protein which can bind to a target polynucleotide of interest can be employed as a PBP. Chemical methods for attaching the signaling chromophore to the sensor PBP are known. Specific sensor PBP structures, including structures conjugated to chromophores, can be custom-made using commercial sources or chemically synthesized. Non-limiting examples of PBPs include DNA-binding proteins including transcription factors, splicing factors, poly(A) binding proteins, chromatin components, viral proteins, proteins which detect viral infection, replication factors, and proteins involved in mitotic and/or meiotic cell division. RNA-protein interactions mediate important cellular processes including transcription, posttranscriptional modifications, RNA splicing, and translation[10,11,12,13]. The replication cycle of many pathogenic viruses, such as the human immunodeficiency virus type 1 (HIV-1)[14], picornaviruses[15] and influenza viruses[16], rely on specific RNA-protein interactions. The specificity of such interactions can be used as the basis for sequence specific sensors for utility in medical diagnostics and genomic studies. Exemplary polynucleotide binding proteins include zinc-finger proteins, homeodomain proteins, winged-helix (forkhead) proteins, leucine-zipper proteins, helix-loop-helix proteins, helix-turn-helix proteins, and histone-like proteins. The PBPs may be isolated from a cell source, or may be produced in vitro, for example through in vitro transcription/translation methods or through completely synthetic methods. The PBPs can be naturally occurring proteins, mutants of naturally occurring proteins, randomly produced proteins produced, for example, by molecular evolution methods, or suspected polynucleotide binding proteins of unknown binding specificity. Examples of specific PBP's which can be used include Tat which binds to the Rev Responsive Element of human immunodeficiency virus (HIV), the matrix protein M1 which binds to Type A influenza virus RNA, and hnRNP U protein which binds to pre-ribosomal RNA.

In some cases it may be desirable to add an organic solvent, for example a water miscible organic solvent such as ethanol, to an assay utilizing a CCP to decrease hydrophobic interactions between the CCP and another component of the assay and thereby reduce background signal.

Where the target is present in a biological sample, the portion of a sample comprising or suspected of comprising the target can be any source of biological material that can be obtained from a living organism directly or indirectly, including cells, tissue or fluid, and the deposits left by that organism, including viruses, mycoplasma, and fossils. The sample may comprise a target polynucleotide prepared through synthetic means, in whole or in part. Typically, the sample is obtained as or dispersed in a predominantly aqueous medium. Nonlimiting examples of the sample include blood, urine, semen, milk, sputum, mucus, a buccal swab, a vaginal swab, a rectal swab, an aspirate, a needle biopsy, a section of tissue obtained for example by surgery or autopsy, plasma, serum, spinal fluid, lymph fluid, the external secretions of the skin, respiratory, intestinal, and genitourinary tracts, tears, saliva, tumors, organs, samples of in vitro cell culture constituents (including but not limited to conditioned medium resulting from the growth of cells in cell culture medium, putatively virally infected cells, recombinant cells, and cell components), and a recombinant library comprising polynucleotide sequences. The sample may be presented on a substrate as described herein. The substrate may be a slide comprising the sample, such as is used in fluorescence in situ hybridization (FISH).

The sample can be a positive control sample which is known to contain the target or a surrogate thereof. A negative control sample can also be used which, although not expected to contain the target, is suspected of containing it (via contamination of one or more of the reagents) or another component capable of producing a false positive, and is tested in order to confirm the lack of contamination of the reagents used in a given assay by the target, as well as to determine whether a given set of assay conditions produces false positives (a positive signal even in the absence of target in the sample).

The sample can be diluted, dissolved, suspended, extracted or otherwise treated to solubilize and/or purify any target present or to render it accessible, for example to reagents which are used in an amplification scheme or to detection reagents. Where the sample contains cells, the cells can be lysed or permeabilized to release the polynucleotides within the cells. One step permeabilization buffers can be used to lyse cells which allow further steps to be performed directly after lysis, for example a polymerase chain reaction.

Detection of target polynucleotides. Where the conformationally flexible polymer is used to detect a target polynucleotide in a sample, the target polynucleotide can be single-stranded, double-stranded, or higher order, and can be linear or circular. Exemplary single-stranded target polynucleotides include mRNA, rRNA, tRNA, hnRNA, ssRNA or ssDNA viral genomes, although these polynucleotides may contain internally complementary sequences and significant secondary structure. Exemplary double-stranded target polynucleotides include genomic DNA, mitochondrial DNA, chloroplast DNA, dsRNA or dsDNA viral genomes, plasmids, phage, and viroids. The target polynucleotide can be prepared synthetically or purified from a biological source. The target polynucleotide may be purified to remove or diminish one or more undesired components of the sample or to concentrate the target polynucleotide. Conversely, where the target polynucleotide is too concentrated for the particular assay, the target polynucleotide may be diluted.

Following sample collection and optional nucleic acid extraction, the nucleic acid portion of the sample comprising the target polynucleotide can be subjected to one or more preparative reactions. These preparative reactions can include in vitro transcription (IVT), labeling, fragmentation, amplification and other reactions. mRNA can first be treated with reverse transcriptase and a primer to create cDNA prior to detection and/or amplification; this can be done in vitro with purified mRNA or in situ, e.g. in cells or tissues affixed to a slide. A variety of amplification methods are suitable for use; nonlimiting examples of suitable amplification reactions include the polymerase chain reaction method (PCR), the ligase chain reaction (LCR), self sustained sequence replication (3SR), nucleic acid sequence-based amplification (NASBA), the use of Q Beta replicase, reverse transcription, nick translation, and the like.

The target polynucleotide can be typically amplified by contacting one or more strands of the target polynucleotide with a primer and a polymerase having suitable activity to extend the primer and copy the target polynucleotide to produce a full-length complementary polynucleotide or a smaller portion thereof. Any enzyme having a polymerase activity which can copy the target polynucleotide can be used, including DNA polymerases, RNA polymerases, reverse transcriptases, enzymes having more than one type of polymerase activity, and the enzyme can be thermolabile or thermostable. Mixtures of enzymes can also be used.

Suitable reaction conditions are chosen to permit amplification of the target polynucleotide, including pH, buffer, ionic strength, presence and concentration of one or more salts, presence and concentration of reactants and cofactors such as nucleotides and magnesium and/or other metal ions (e.g., manganese), optional cosolvents, temperature, thermal cycling profile for amplification schemes comprising a polymerase chain reaction, and may depend in part on the polymerase being used as well as the nature of the sample. Cosolvents include formamide (typically at from about 2 to about 10%), glycerol (typically at from about 5 to about 10%), and DMSO (typically at from about 0.9 to about 10%). Techniques may be used in the amplification scheme in order to minimize the production of false positives or artifacts produced during amplification. These include "touchdown" PCR, hot-start techniques, use of nested primers, or designing PCR primers so that they form stem-loop structures in the event of primer-dimer formation and thus are not amplified. Techniques to accelerate PCR can be used, for example centrifugal PCR, which allows for greater convection within the sample, and comprising infrared heating steps for rapid heating and cooling of the sample. One or more cycles of amplification can be performed.

Amplified target polynucleotides may be subjected to post amplification treatments. For example, in some cases, it may be desirable to fragment the target polynucleotide prior to hybridization in order to provide segments which are more readily accessible. Fragmentation of the nucleic acids can be carried out by any method producing fragments of a size useful in the assay being performed; suitable physical, chemical and enzymatic methods are known in the art.

An amplification reaction can be performed under conditions which allow a sensor polynucleotide to hybridize to the amplification product during at least part of an amplification cycle. When the assay is performed in this manner, real-time detection of this hybridization event can take place by monitoring for a change in light emission from the signaling chromophore that occurs upon such hybridization during the amplification scheme.

Signaling Chromophores. Chromophores useful in the methods described herein include any substance which can absorb energy from a flexible CCP and emit light. Chemical methods for attaching a signaling chromophore to a sensor molecule or other assay component are known.[17] For multiplexed assays, a plurality of different signaling chromophores can be used with detectably different emission spectra. The chromophore can be a lumophore or a fluorophore. Typical fluorophores include fluorescent dyes, semiconductor nanocrystals, lanthanide chelates, polynucleotide-specific dyes and green fluorescent protein.

Exemplary fluorescent dyes include fluorescein, 6-FAM, rhodamine, Texas Red, tetramethylrhodamine, carboxyrhodamine, carboxyrhodamine 6G, carboxyrhodol, carboxyrhodamine 110, Cascade Blue, Cascade Yellow, coumarin, Cy2®, Cy3®, Cy3.5®, Cy5®, Cy5.5®, Cy-Chrome, phycoerythrin, PerCP (peridinin chlorophyll-a Protein), PerCP-Cy5.5, JOE (6-carboxy-4',5'-dichloro-2',7'-dimethoxyfluorescein), NED, ROX (5-(and-6)-carboxy-X-rhodamine), HEX, Lucifer Yellow, Marina Blue, Oregon Green 488, Oregon Green 500, Oregon Green 514, Alexa Fluor® 350, Alexa Fluor® 430, Alexa Fluor® 488, Alexa Fluor® 532, Alexa Fluor® 546, Alexa Fluor® 568, Alexa Fluor® 594, Alexa Fluor® 633, Alexa Fluor® 647, Alexa Fluor® 660, Alexa Fluor® 680, 7-amino-4-methylcoumarin-3-acetic acid, BODIPY® FL, BODIPY® FL-Br$_2$, BODIPY® 530/550, BODIPY® 558/568, BODIPY® 564/570, BODIPY® 576/589, BODIPY® 581/591, BODIPY® 630/650, BODIPY® 650/665, BODIPY® R6G, BODIPY® TMR, BODIPY® TR, conjugates thereof, and combinations thereof. Exemplary lanthanide chelates include europium chelates, terbium chelates and samarium chelates.

A wide variety of fluorescent semiconductor nanocrystals ("SCNCs") are known in the art; methods of producing and utilizing semiconductor nanocrystals are described in: PCT Publ. No. WO 99/26299 published May 27, 1999, inventors Bawendi et al.; U.S. Pat. No. 5,990,479 issued Nov. 23, 1999 to Weiss et al.; and Bruchez et al., Science 281:2013, 1998. Semiconductor nanocrystals can be obtained with very narrow emission bands with well-defined peak emission wavelengths, allowing for a large number of different SCNCs to be used as signaling chromophores in the same assay, optionally in combination with other non-SCNC types of signaling chromophores.

Exemplary polynucleotide-specific dyes include acridine orange, acridine homodimer, actinomycin D, 7-aminoactinomycin D (7-AAD), 9-amino-6-chloro-2-methoxyacridine (ACMA), BOBO™-1 iodide (462/481), BOBO™-3 iodide (570/602), BO-PRO™-1 iodide (462/481), BO-PRO™-3 iodide (575/599), 4',6-diamidino-2-phenylindole, dihydrochloride (DAPI), 4',6-diamidino-2-phenylindole, dihydrochloride (DAPI), 4',6-diamidino-2-phenylindole, dilactate (DAPI, dilactate), dihydroethidium (hydroethidine), dihydroethidium (hydroethidine), dihydroethidium (hydroethidine), ethidium bromide, ethidium diazide chloride, ethidium homodimer-1 (EthD-1), ethidium homodimer-2 (EthD-2), ethidium monoazide bromide (EMA), hexidium iodide, Hoechst 33258, Hoechst 33342, Hoechst 34580, Hoechst S769121, hydroxystilbamidine, methanesulfonate, JOJO™-1 iodide (529/545), JO-PRO™-1 iodide (530/546), LOLO™-1 iodide (565/579), LO-PRO™-1 iodide (567/580), NeuroTrace™ 435/455, NeuroTrace™ 500/525, NeuroTrace™ 515/535, NeuroTrace™ 530/615, NeuroTrace™ 640/660, OliGreen, PicoGreen® ssDNA, PicoGreen® dsDNA, POPO™-1 iodide (434/456), POPO™-3 iodide (534/570), PO-PRO™-1 iodide (435/455), PO-PRO™-3 iodide (539/567), propidium iodide, RiboGreen®, SlowFade®, SlowFade® Light, SYBR® Green I, SYBR® Green II, SYBR® Gold, SYBR® 101, SYBR® 102, SYBR® 103, SYBR® DX, TO-PRO®-1, TO-PRO®-3, TO-PRO®-5, TOTO®-1, TOTO®-3, YO-PRO®-1 (oxazole yellow), YO-PRO®-3, YOYO®-1, YOYO®-3, TO, SYTOX® Blue, SYTOX® Green, SYTOX® Orange, SYTO® 9, SYTO® BC, SYTO® 40, SYTO® 41, SYTO® 42, SYTO® 43, SYTO® 44, SYTO® 45, SYTO® Blue, SYTO® 11, SYTO® 12, SYTO® 13, SYTO® 14, SYTO® 15, SYTO® 16, SYTO® 20, SYTO® 21, SYTO® 22, SYTO® 23, SYTO® 24, SYTO® 25, SYTO® Green, SYTO® 80, SYTO® 81, SYTO® 82, SYTO® 83, SYTO® 84, SYTO® 85, SYTO® Orange, SYTO® 17, SYTO® 59, SYTO® 60, SYTO® 61, SYTO® 62, SYTO® 63, SYTO® 64, SYTO® Red, netropsin, distamycin, acridine orange, 3,4-benzopyrene, thiazole orange, TOMEHE, daunomycin, acridine, pentyl-TOTAB, and butyl-TOTIN. Asymmetric cyanine dyes may be used as the polynucleotide-specific dye. Other dyes of interest include those described by Geierstanger, B. H. and Wemmer, D. E., Annu. Rev. Vioshys. Biomol. Struct. 1995, 24, 463–493, by Larson, C. J. and Verdine, G. L., Bioorganic Chemistry: Nucleic Acids, Hecht, S. M., Ed., Oxford University Press: New York, 1996; pp 324–346, and by Glumoff, T. and Goldman, A. Nucleic Acids in Chemistry and Biology, $2^{nd}$ ed., Blackburn, G. M. and Gait, M. J., Eds., Oxford University Press: Oxford, 1996, pp375–441. The polynucleotide-specific dye may be an intercalating dye, and may be specific for double-stranded polynucleotides. Other dyes and fluorophores are described at www.probes.com (Molecular Probes, Inc.).

The term "green fluorescent protein" refers to both native *Aequorea* green fluorescent protein and mutated versions that have been identified as exhibiting altered fluorescence characteristics, including altered excitation and emission maxima, as well as excitation and emission spectra of different shapes (Delagrave, S. et al. (1995) Bio/Technology 13:151–154; Heim, R. et al. (1994) Proc. Natl. Acad. Sci. USA 91:12501–12504; Heim, R. et al. (1995) Nature 373: 663–664). Delagrave et al. isolated mutants of cloned

*Aequorea victoria* GFP that had red-shifted excitation spectra. Heim, R. et al. reported a mutant (Tyr66 to His) having a blue fluorescence.

In one variation, a second signaling chromophore, which may be directly or indirectly attached to another of the assay components and/or to a substrate, is used to receive energy from the initial signaling chromophore. In particular applications, this can provide for significant additional selectivity. For example, a polynucleotide-specific dye can be used as either the initial or second signaling chromophore, and may be specific for double-stranded sequences. Energy can then be transferred from the excited conformationally flexible CCP to the initial signaling chromophore, which subsequently transfers energy to the second signaling chromophore, in an overall format that is selective for the target. This cascade of signaling chromophores can, in principle, be extended to use any number of signaling chromophores with compatible absorption and emission profiles. In one embodiment of this variation, an intercalating dye that is specific for double-stranded polynucleotides is used as the second signaling chromophore, and an initial signaling chromophore that is capable of transferring energy to the second signaling chromophore is conjugated to a sensor polynucleotide. The intercalating dye provides the added selective requirement that the sensor and target polynucleotides hybridize before it is recruited to the detection complex. In the presence of target, the duplex is formed, the dye is recruited, and excitation of the multichromophore leads to signaling from the second signaling chromophore.

Substrates. The methods described herein can be performed on a substrate in any of a variety of formats. One or more of the assay components may be incorporated in, attached to, or otherwise associated with the substrate, directly or indirectly. The substrate can comprise a wide range of material, either biological, nonbiological, organic, inorganic, or a combination of any of these. For example, the substrate may be a polymerized Langmuir Blodgett film, functionalized glass, Si, Ge, GaAs, GaP, $SiO_2$, $SiN_4$, modified silicon, or any one of a wide variety of gels or polymers such as (poly)tetrafluoroethylene, (poly)vinylidenedifluoride, polystyrene, cross-linked polystyrene, polyacrylic, polylactic acid, polyglycolic acid, poly(lactide coglycolide), polyanhydrides, poly(methyl methacrylate), poly(ethylene-co-vinyl acetate), polysiloxanes, polymeric silica, latexes, dextran polymers, epoxies, polycarbonates, agarose, poly (acrylamide) or combinations thereof. Conducting polymers and photoconductive materials can be used.

Substrates can be planar crystalline substrates such as silica based substrates (e.g. glass, quartz, or the like), or crystalline substrates used in, e.g., the semiconductor and microprocessor industries, such as silicon, gallium arsenide, indium doped GaN and the like, and includes semiconductor nanocrystals.

The substrate can take the form of a photodiode, an optoelectronic sensor such as an optoelectronic semiconductor chip or optoelectronic thin-film semiconductor, or a biochip. The location(s) of the individual sensor(s) on the substrate can be addressable; this can be done in highly dense formats, and the location(s) can be microaddressable or nanoaddressable.

Silica aerogels can also be used as substrates, and can be prepared by methods known in the art. Aerogel substrates may be used as free standing substrates or as a surface coating for another substrate material.

The substrate can take any form and typically is a plate, slide, bead, pellet, disk, particle, microparticle, nanoparticle, strand, precipitate, optionally porous gel, sheets, tube, sphere, container, capillary, pad, slice, film, chip, multiwell plate or dish, optical fiber, etc. The substrate can be any form that is rigid or semi-rigid. The substrate may contain raised or depressed regions on which a sensor molecule and/or other assay component is located. The surface of the substrate can be etched using well known techniques to provide for desired surface features, for example trenches, v-grooves, mesa structures, or the like.

Surfaces on the substrate can be composed of the same material as the substrate or can be made from a different material, and can be coupled to the substrate by chemical or physical means. Such coupled surfaces may be composed of any of a wide variety of materials, for example, polymers, plastics, resins, polysaccharides, silica or silica-based materials, carbon, metals, inorganic glasses, membranes, or any of the above-listed substrate materials. The surface can be optically transparent and can have surface Si—OH functionalities, such as those found on silica surfaces.

The substrate and/or its optional surface are chosen to provide appropriate optical characteristics for the synthetic and/or detection methods used. The substrate and/or surface can be transparent to allow the exposure of the substrate by light applied from multiple directions. The substrate and/or surface may be provided with reflective "mirror" structures to increase the recovery of light.

The substrate and/or its surface is generally resistant to, or is treated to resist, the conditions to which it is to be exposed in use, and can be optionally treated to remove any resistant material after exposure to such conditions.

Sensor molecules can be fabricated on or attached to the substrate by any suitable method, for example the methods described in U.S. Pat. No. 5,143,854, PCT Publ. No. WO 92/10092, U.S. patent application Ser. No. 07/624,120, filed Dec. 6, 1990 (now abandoned), Fodor et al., Science, 251: 767–777 (1991), and PCT Publ. No. WO 90/15070). Techniques for the synthesis of these arrays using mechanical synthesis strategies are described in, e.g., PCT Publication No. WO 93/09668 and U.S. Pat. No. 5,384,261.

Still further techniques include bead based techniques such as those described in PCT Appl. No. PCT/US93/04145 and pin based methods such as those described in U.S. Pat. No. 5,288,514.

Additional flow channel or spotting methods applicable to attachment of sensor molecules to the substrate are described in U.S. patent application Ser. No. 07/980,523, filed Nov. 20, 1992, and U.S. Pat. No. 5,384,261. Reagents are delivered to the substrate by either (1) flowing within a channel defined on predefined regions or (2) "spotting" on predefined regions. A protective coating such as a hydrophilic or hydrophobic coating (depending upon the nature of the solvent) can be used over portions of the substrate to be protected, sometimes in combination with materials that facilitate wetting by the reactant solution in other regions. In this manner, the flowing solutions are further prevented from passing outside of their designated flow paths.

Typical dispensers include a micropipette optionally robotically controlled, an ink-jet printer, a series of tubes, a manifold, an array of pipettes, or the like so that various reagents can be delivered to the reaction regions sequentially or simultaneously.

Excitation and Detection of the Chromophores

Any instrument that provides a wavelength that can excite the conformationally flexible CCP and is shorter than the emission wavelength(s) to be detected can be used for excitation. The excitation source preferably does not significantly excite the signaling chromophore directly. The source may be: a broadband UV light source such as a deuterium lamp with an appropriate filter, the output of a white light source such as a xenon lamp or a deuterium lamp after passing through a monochromator to extract out the desired wavelengths, a continuous wave (cw) gas laser, a solid state diode laser, or any of the pulsed lasers. The emitted light from the signaling chromophore can be detected through any suitable device or technique; many suitable approaches are known in the art. For example, a fluorometer or spectrophotometer may be used to detect whether the test sample emits light of a wavelength characteristic of the signaling chromophore upon excitation of the CCP.

Kits

Kits comprising reagents useful for performing the methods of the invention are also provided. In one embodiment, a kit comprises a sensor molecule that can bind to a target molecule of interest and a conformationally flexible. CCP. The sensor molecule may be conjugated to a signaling chromophore. In the presence of the target in the sample, the sensor binds to the target, resulting in increased emission of energy from the signaling chromophore, which can be detected.

The components of the kit are retained by a housing. Instructions for using the kit to perform a method of the invention can be provided with the housing, and can be provided in any fixed medium. The instructions may be located inside the housing or outside the housing, and may be printed on the interior or exterior of any surface forming the housing which renders the instructions legible. The kit may be in multiplex form, containing pluralities of one or more different sensor molecules which can bind to corresponding different target molecules.

EXAMPLES

The following examples are set forth so as to provide those of ordinary skill in the art with a complete description of how to make and use the present invention, and are not intended to limit the scope of what is regarded as the invention. Efforts have been made to ensure accuracy with respect to numbers used (e.g., amounts, temperature, etc.) but some experimental error and deviation should be accounted for. Unless otherwise indicated, parts are parts by weight, temperature is degree centigrade and pressure is at or near atmospheric, and all materials are commercially available.

In one embodiment, conformationally flexible cationic water-soluble conjugated polymers were synthesized through the Suzuki coupling reaction and a post-polymerization quarternization step. Synthetic examples are given with respect to the specific polymers under Formula 1. The synthetic routes are shown in Scheme 1.

Scheme 1. Synthetic procedure for cationic water-soluble polymers.

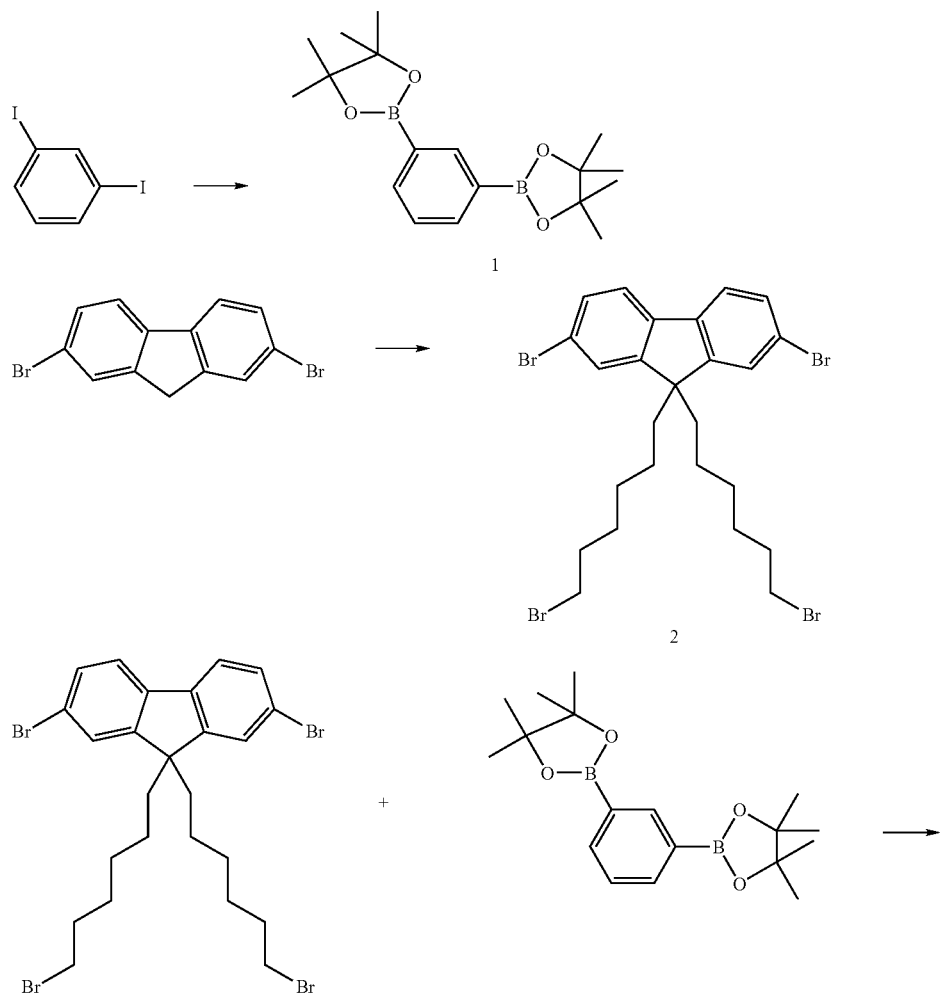

-continued
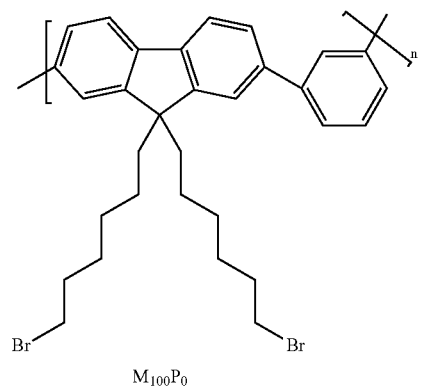
$M_{100}P_0$
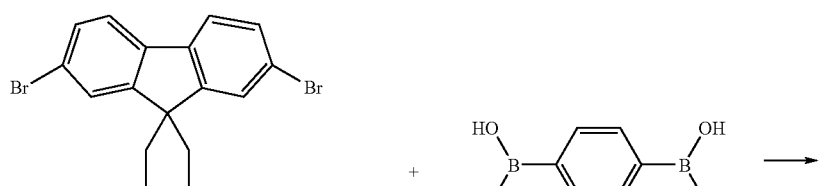
$M_0P_{100}$
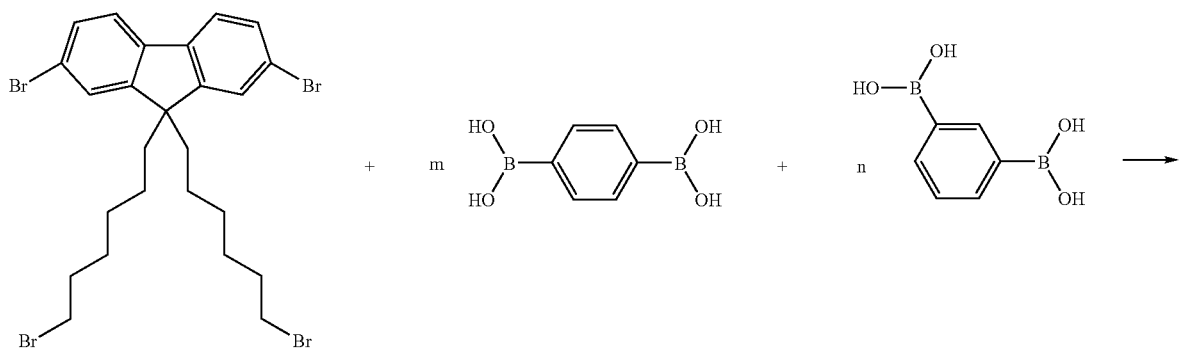

-continued

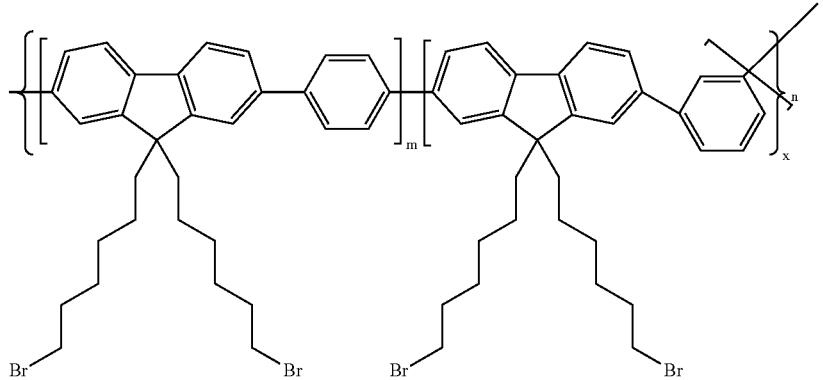

M$_{25}$P$_{75}$  m = 75, n = 25
M$_{50}$P$_{50}$  m = 50, n = 50
M$_{75}$P$_{25}$  m = 25, n = 75
M$_{90}$P$_{10}$  m = 10, n = 90

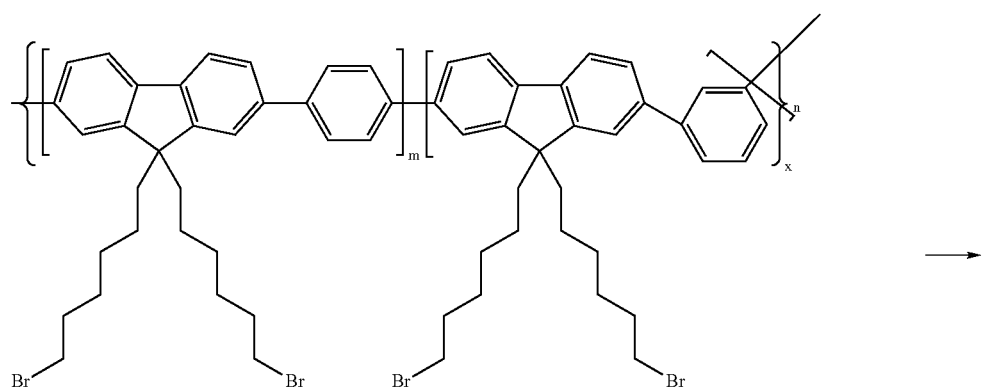

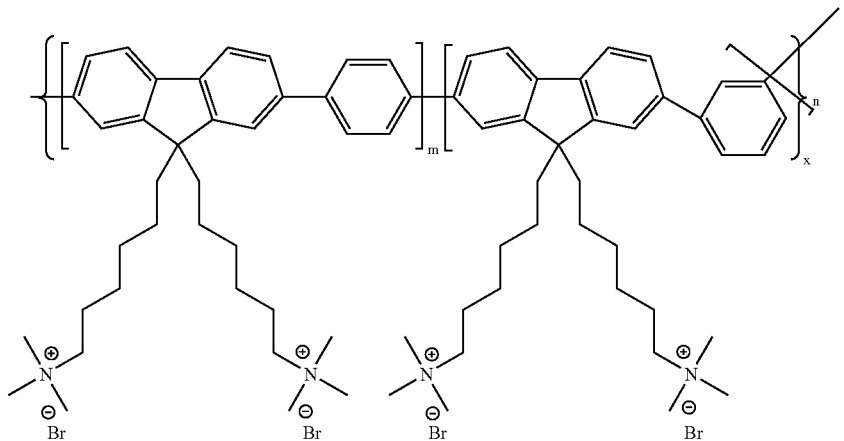

M$_{25}$P$_{100}$$^+$  m = 100, n = 0
M$_{25}$P$_{75}$$^+$  m = 75, n = 25
M$_{50}$P$_{50}$$^+$  m = 50, n = 50
M$_{75}$P$_{25}$$^+$  m = 25, n = 75
M$_{90}$P$_{10}$$^+$  m = 10, n = 90
M$_{100}$P$_{0}$$^+$  m = 0, n = 100

An overview of the method is as follows. 1,3-Bis(4,4,5,5-tetramethyl-1,3,2-dioxaborolan)phenylene (1) was obtained in 46% yield by treating 1,3-diiodobenzene with bis(pinacolato)diborane in the presence of PdCl$_2$(dppf) and potassium acetate in DMSO. 2,7-Dibromo-9,9-bis(6′-bromohexyl)fluorene (2) was obtained by the treatment of 2,7-dibromofluorene with 50% KOH, followed by addition of excess of 1,6-dibromohexane in 85% yield. Coupling of one equivalent of the dibromide monomer with one net equivalent of diboronic acid or diboronic ester, under Suzuki coupling conditions using PdCl$_2$(dppf) in refluxing THF/H$_2$O for 24 h, followed by purification gave the desired polymers in 39% to 88% yield. The products were thoroughly washed with methanol and acetone, and then dried in vacuum for 24 h. Formation of the water-soluble polymers was achieved by stirring the polymer in condensed trimethylamine in a THF/H$_2$O solvent mixture for 24 h.

Example 1

1,3-Bis(4,4,5,5,-tetramethyl-1,3,2-dioxaborolan) phenylene (1)

A flask charged with 1,3-diiodobenzene (1.0 g, 3 mmol), bis(pinacolato)diborane (2.3 g, 9 mmol), potassium acetate (2.1 g, 21 mmol), PdCl$_2$(dppf) (150 mg, 0.18 mmol), and 15 mL of anhydrous DMSO was degassed for 15 minutes. The mixture was stirred at 80° C. for 12 h, cooled to room temperature and then poured into 100 mL of ice water. The mixture was extracted with CHCl$_3$, and the combined organic layers were dried over anhydrous MgSO$_4$. After the solvent was evaporated, the residue was purified by chromatography using silica gel (Hexane:CHCl$_3$=1:1) and then recrystallized from ethanol to afford 1 (460 mg, 46%) as a white solid. $^1$H NMR (200 MHz, CDCl$_3$): δ 8.28 (s, 1H), 7.91–7.89 (d, 2H), 7.38 (t, 1H), 1.35 (s, 24H). $^{13}$C NMR (50 MHz, CDCl$_3$): δ 141.4, 137.8, 127.3, 83.9, 25.1.

Example 2

2,7-Dibromo-9,9-bis(6'-bromohexyl)fluorene (2)

To a mixture of tetrabutylammonium bromide (300 mg, 9.3 mmol), aqueous potassium hydroxide (100 mL, 50%) and 1,6-dibromohexane (22.6 g, 92.6 mmol) was added 2,7-dibromofluorene at 75° C. After 15 minutes, the mixture was cooled down to room temperature, and extracted with CH$_2$Cl$_2$. The organic layer was washed with water, aqueous HCl, water and brine, dried over MgSO$_4$, and then concentrated. Unreacted 1,6-dibromohexane was distilled off. The residue was purified by silica gel column chromatography (Hexane:CHCl$_3$=9:1) and recrystallized from ethanol to give 2 (4.8 g, 80%) as a white solid. $^1$H NMR (200 MHz, CDCl$_3$): δ 7.2–7.4 (m, 6H), 3.12 (t, 4H), 1.75 (t, 4H), 1.5 (m, 4H), 1.0 (m, 8H), 0.4 (m, 4H). $^{13}$C NMR (50 MHz, CDCl$_3$): δ 152.3, 139.2, 130.5, 126.2, 121.7, 121.4, 55.7, 40.2, 34.1, 32.8, 29.1, 27.9, 23.6.

Example 3

Poly(9,9-bis(6'-bromohexyl)fluorene-co-alt-1,3-phenylene) (M$_{100}$P$_0$)

2,7-Dibromo-9,9-bis(6'-bromohexyl)fluorene (325 mg, 0.5 mmol), 1,3-bis(4,4,5,5-tetramethyl-1,3,2-dioxaborolan) phenylene (166 mg, 0.5 mmol), Pd(PPh$_3$)$_4$ (8 mg) and potassium carbonate (830 mg, 6 mmol) were placed in a 25 mL round bottle flask. A mixture of water (3 mL) and toluene (5 mL) was added to the flask. After degassing, the mixture was refluxed at 85° C. for 20 h, and then precipitated into methanol. The polymer was filtered and washed with methanol and acetone, and then dried in vacuum for 24 h to afford M$_{100}$P$_0$ (251 mg, 88%) as a light yellow solid. $^1$H NMR (200 MHz, CDCl$_3$): δ 7.9–7.6 (m, 10H), 3.3–3.2 (t, 4H), 2.1 (m, 4H), 1.7–1.6 (m, 4H), 1.3–1.2 (m, 8H), 0.8 (m, 4H). $^{13}$C NMR (50 MHz, CDCl$_3$): δ 152.1, 142.9, 140.9, 130.1, 129.5, 128.0, 126.8, 122.5, 120.9, 55.9, 40.9, 34.5, 33.3, 29.7, 28.5, 24.3. GPC (THF, polystyrene standard), M$_w$: 40,250 g/mol; M$_n$: 14,980 g/mol; PDI: 2.8. UV-vis (CHCl$_3$): α$_{max}$=337 nm; PL (CHCl$_3$): λ$_{max}$=363 nm.

Example 4

Poly(9,9-bis(6'-bromohexyl)fluorene-co-alt-1,4-phenylene) (M$_0$P$_{100}$)

2,7-Dibromo-9,9-bis(6'-bromohexyl)fluorene (325 mg, 0.5 mmol), 1,4-phenylenebisboronic acid (82.9 mg, 0.5 mmol), Pd(dppf)Cl$_2$ (7 mg) and potassium carbonate (830 mg, 6 mmol) were placed in a 25 mL round bottle flask. A mixture of water (3 mL) and THF (6 mL) was added to the flask and degassed. The mixture was refluxed at 85° C. for 24 h, and then precipitated into methanol. The polymer was filtered and washed with methanol and acetone, and then dried in vacuum for 24 h to afford M$_0$P$_{100}$ (220 mg, 78%) as an off-white solid. $^1$H NMR (200 MHz, CDCl$_3$): δ 7.8 (m, 5H), 7.7–7.6 (m, 4H), 7.5 (m, 1H), 3.3 (t, 4H), 2.1 (m, 4H), 1.7 (m, 4H), 1.3–1.2 (m, 8H), 0.8 (m, 4H). $^{13}$CNMR (50 MHz, CDCl$_3$): δ 151.9, 140.9, 140.7, 140.2, 128.1, 126.6, 121.8, 120.8, 55.7, 40.9, 34.5, 33.2, 29.6, 28.3, 24.2. GPC (THF, polystyrene standard), M$_w$: 25,850 g/mol; M$_n$: 12,840 g/mol; PDI: 2.0. UV-vis (CHCl$_3$): λ$_{max}$=372 nm; PL (CHCl$_3$): λ$_{max}$=408 nm.

Example 5

Random Copolymer M$_{25}$P$_{75}$ 2,7-Dibromo-9,9-bis(6'-bromohexyl)fluorene (325 mg, 0.5 mmol), 1,4-phenylenebisboronic acid (62.2 mg, 0.375 mmol), 1,3-phenylenebisboronic acid (20.7 mg, 0.125 mmol), Pd(dppf)Cl$_2$ (7 mg) and potassium carbonate (830 mg, 6 mmol) were placed in a 25 mL round bottle flask. A mixture of water (3 mL) and THF (6 mL) was added to the flask and degassed. The mixture was refluxed at 85° C. for 24 h, and then precipitated into methanol. The polymer was filtered and washed with methanol and acetone, and then dried in vacuum for 24 h to afford M$_{25}$P$_{75}$ (248 mg, 88%) as an off-white solid. $^1$H NMR (200 MHz, CDCl$_3$): δ 7.9–7.6 (m, 10H), 3.3–3.2 (t, 4H), 2.1 (m, 4H), 1.7–1.6 (m, 4H), 1.3–1.2 (m, 8H), 0.8 (m, 4H). GPC (THF, polystyrene standard), M$_w$: 29,000 g/mol; M$_n$: 14,720 g/mol; PDI: 1.9. UV-vis (CHCl$_3$): λ$_{max}$=365 nm; PL (CHCl$_3$): λ$_{max}$=407 nm.

Example 6

Random Copolymer M$_{50}$P$_{50}$ 2,7-Dibromo-9,9-bis(6'-bromohexyl)fluorene (325 mg, 0.5 mmol), 1,4-phenylenebisboronic acid (41.5 mg, 0.25 mmol), 1,3-phenylenebisboronic acid (41.5 mg, 0.25 mmol), Pd(dppf)Cl$_2$ (7 mg) and potassium carbonate (830 mg, 6 mmol) were placed in a 25 mL round bottle flask. A mixture of water (3 mL) and THF (6 mL) was added to the flask and degassed. The mixture was refluxed at 85° C. for 24 h, and then precipitated into methanol. The polymer was filtered and washed with methanol and acetone, and then dried in vacuum for 24 h to afford M$_{50}$P$_{50}$ (220 mg, 78%) as an off-white solid. $^1$H NMR (200 MHz, CDCl$_3$): δ 7.9–7.6 (m, 10H), 3.3–3.2 (t, 4H), 2.1 (m, 4H), 1.7–1.6 (m, 4H), 1.3–1.2 (m, 8H), 0.8 (m, 4H). GPC (THF, polystyrene standard), M$_w$: 17,340 g/mol; M$_n$: 10,080 g/mol; PDI: 1.7. UV-vis (CHCl$_3$): λ$_{max}$=351 nm; PL (CHCl$_3$): λ$_{max}$=405 nm.

Example 7

Random Copolymer M$_{75}$P$_{25}$ 2,7-Dibromo-9,9-bis(6'-bromohexyl)fluorene (325 mg, 0.5 mmol), 1,4-phenylenebisboronic acid (20.7 mg, 0.125 mmol), 1,3-phenylenebisboronic acid (62.2 mg, 0.375 mmol), Pd(dppf)Cl$_2$ (7 mg) and potassium carbonate (830 mg, 6 mmol) were placed in a 25 mL round bottle flask. A mixture of water (3 mL) and THF (6 mL) was added to the flask. After degassing, the mixture was refluxed at 85° C. for 24 h, and then precipitated into methanol. The polymer was filtered and washed with methanol and acetone, and then dried in vacuum for 24 h to afford M$_{75}$P$_{25}$ (130 mg, 46%) as an off-white solid. $^1$H NMR (200 MHz, CDCl$_3$): δ 7.9–7.6 (m, 10H), 3.3–3.2 (t, 4H), 2.1 (m, 4H), 1.7–1.6 (m, 4H), 1.3–1.2 (m, 8H), 0.8 (m, 4H). GPC (THF, polystyrene standard), M$_w$: 13,000 g/mol; M$_n$: 8,700 g/mol; PDI: 1.4. UV-vis (CHCl$_3$): λ$_{max}$=342 nm; PL (CHCl$_3$): λ$_{max}$=400 nm.

Example 8

Random Copolymer M$_{90}$P$_{10}$ 2,7-Dibromo-9,9-bis(6'-bromohexyl)fluorene (325 mg, 0.5 mmol), 1,4-phenylenebisboronic acid (8 mg, 0.05 mmol), 1,3-phenylenebisboronic acid (75 mg, 0.45 mmol), Pd(dppf)Cl$_2$ (7 mg) and potassium carbonate (830 mg, 6 mmol) were placed in a 25 mL round bottle flask. A mixture of water (3 mL) and THF (6 mL) was added to the flask and degassed. The mixture was refluxed at 85° C. for 24 h, and then precipitated into methanol. The polymer was filtered and washed with methanol and acetone and then dried in vacuum for 24 h to afford M$_{90}$P$_{10}$ (110 mg, 39%) as an off-white solid. $^1$H NMR (200 MHz, CDCl$_3$): δ 7.9–7.6 (m, 10H), 3.3–3.2 (t, 4H), 2.1 (m, 4H), 1.7–1.6 (m, 4H), 1.3–1.2 (m, 8H), 0.8 (m, 4H). GPC (THF, polystyrene standard), M$_w$: 8,400 g/mol; M$_n$: 5,800 g/mol; PDI: 1.4. UV-vis (CHCl$_3$): λ$_{max}$=338 nm; PL (CHCl$_3$): λ$_{max}$=400 nm.

Example 9

Poly(9,9-bis(6'-N,N,N,-trimethylammonium)hexyl)fluorene-co-alt-1,3-phenylene) dibromide (M$_{100}$P$_0^+$)

Condensed trimethylamine (2 mL) was added dropwise to a solution of the neutral polymer M$_{100}$P$_0$ (60 mg) in THF (10 mL) at −78° C. The mixture was allowed to warm up to room temperature. The precipitate was re-dissolved by the addition of water (10 mL). After the mixture was cooled down to −78° C., extra trimethylamine (2 mL) was added and the mixture was stirred for 24 h at room temperature. After removing most of the solvent, acetone was added to precipitate M$_{100}$P$_0^+$ (63 mg, 78%) as a light yellow powder. $^1$H NMR (500 MHz, CD$_3$OD): δ 8.1–7.7 (m, 10H), 3.3–3.2 (t, 4H), 3.1 (s, 18H), 2.3 (br, 4H), 1.6 (br, 4H), 1.3 (br, 8H), 0.8 (br, 4H). $^{13}$C NMR (125 MHz, CD$_3$OD): δ 151.9, 142.4, 140.9, 140.6, 129.77, 126.5, 126.1, 125.6, 121.6, 120.5, 66.7, 55.7, 52.5, 40.1, 29.2, 25.8, 23.8, 22.6. UV-vis (H$_2$O): 80$_{max}$=334 nm; PL (H$_2$O): λ$_{max}$=369 nm. ε=3.69×10$^4$ M$^{-1}$ cm$^{-1}$ per monomer unit.

Example 10

Poly(9,9-bis(6'-N,N,N,-trimethylammonium)hexyl)fluorene-co-alt-1,4-phenylene) dibromide (M$_0$P$_{100}^+$)

Condensed trimethylamine (2 mL) was added dropwise to a solution of the neutral polymer M$_0$P$_{100}$ (60 mg) in THF (10 mL) at −78° C. The mixture was allowed to warm up to room temperature. The precipitate was re-dissolved by the addition of water (10 mL). After the mixture was cooled down to −78° C., extra trimethylamine (2 mL) was added and the mixture was stirred for 24 h at room temperature. After removing most of the solvent, acetone was added to precipitate M$_0$P$_{100}^+$ (72 mg, 89%) as an off-white powder. $^1$H NMR (500 MHz, CD$_3$OD): δ 8.0–7.8 (m, 10H), 3.3–3.2 (t, 4H), 3.1 (s, 18H), 2.3 (br, 4H), 1.6 (br, 4H), 1.3 (br, 8H), 0.8 (br, 4H). $^{13}$C NMR (125 MHz, CD$_3$OD): δ 151.8, 140.9, 140.4, 140.0, 127.6, 126.1, 121.2, 120.5, 66.7, 55.7, 52.5, 40.2, 29.2, 25.8, 23.7, 22.5. Uv-vis (H$_2$O ): λ$_{max}$=382 nm; PL (H$_2$O): λmax=417 mn. ε=4.56×10$^4$ M$^{-1}$ cm$^{-1}$ per monomer unit.

Example 11

Cationic Water-soluble Polymer (M$_{25}$P$_{75}^+$)

Condensed trimethylamine (2 mL) was added dropwise to a solution of the neutral polymer M$_{25}$P$_{75}$ (60 mg) in THF (10 mL) at −78° C. The mixture was allowed to warm up to room temperature. The precipitate was re-dissolved by the addition of water (10 mL). After the mixture was cooled down to −78° C., extra trimethylamine (2 mL) was added and the mixture was stirred for 24 h at room temperature. After removing most of the solvent, acetone was added to precipitate M$_{25}$P$_{75}^+$ (72 mg, 89%) as an off-white powder. $^1$H NMR (500 MHz, CD$_3$OD): δ 8.0–7.5 (m, 10H), 3.3 (br, 4H), 3.1 (s, 18H), 2.3 br, 4H), 1.6 (br, 4H), 1.2 (br, 8H), 0.9 (br, 4H). UV-vis (H$_2$O): λmax=376 nm; PL (H$_2$O): λ$_{max}$417 nm. ε=4.22×10$^4$ M$^{31\ 1}$ cm$^{-1}$ per monomer unit.

Example 12

Cationic Water-soluble Polymer (M$_{50}$P$_{50}^+$)

Condensed trimethylamine (2 mL) was added dropwise to a solution of the neutral polymer M$_{50}$P$_{50}$ (60 mg) in THF (10 mL) at −78° C. The mixture was allowed to warm up to room temperature. The precipitate was re-dissolved by the addition of water (10 mL). After the mixture was cooled down to −78° C., extra trimethylamine (2 mL) was added and the mixture was stirred for 24 h at room temperature. After removing most of the solvent, acetone was added to precipitate M$_{50}$P$_{50}^+$ (68 mg, 84%) as an off-white powder. $^1$H NMR (500 MHz, CD$_3$OD): δ 8.1–7.7 (m, 10H), 3.3 (br, 4H), 3.1 (s, 18H), 2.3 (br, 4H), 1.6 (br, 4H), 1.3 (br, 8H), 0.8 (br, 4H). UV-vis (H$_2$O): λ$_{max}$: 337 nm; PL (H$_2$O): λ$_{max}$=403 nm. ε=3.15×10$^4$ M$^{-1}$ cm$^{-1}$ per monomer unit.

Example 13

Cationic Water-soluble Polymer (M$_{75}$P$_{25}^+$)

Condensed trimethylamine (2 mL) was added dropwise to a solution of the neutral polymer M$_{75}$P$_{25}$ (60 mg) in THF (10 mL) at −78° C. The mixture was allowed to warm up to room temperature. The precipitate was re-dissolved by the addition of water (10 mL). After it was cooled down to −78° C., extra trimethylamine (2 mL) was added and the mixture was stirred for 24 h at room temperature. After removing most of the solvent, acetone was added to precipitate M$_{75}$P$_{25}^+$ (70 mg, 87%) as an off-white powder. $^1$H NMR (500 MHz, CD$_3$OD): δ 8.0–7.7 (m, 10H), 3.3 (br, 4H), 3.1 (s, 18H), 2.3 (br, 4H), 1.6 (br, 4H), 1.3 (br, 8H), 0.8 (br, 4H). UV-vis (H$_2$O): λmax=347 nm; PL (H$_2$O): λmax=410 nm. ε=2.98×10$^4$ M$^{-1}$ cm$^{-1}$ per monomer unit.

Example 14

Cationic Water-soluble Polymer ($M_{90}P_{10}^+$)

Condensed trimethylamine (2 mL) was added dropwise to a solution of the neutral polymer $M_{90}P^{10}$ (60 mg) in THF (10 mL) at −78° C. The mixture was allowed to warm up to room temperature. The precipitate was re-dissolved by the addition of water (10 mL). After the mixture was cooled down to −78° C., extra trimethylamine (2 mL) was added and the mixture was stirred for 24 h at room temperature. After removal most of the solvent, acetone was added to precipitate $M_{90}P_{10}^+$ (61 mg, 75%) as an off-white powder. $^1$H NMR (500 MHz, $CD_3OD$): δ8.0–7.7 (m, 10H), 3.3 (br, 4H), 3.1 (s, 18H), 2.3 (br, 4H), 1.6 (br, 4H), 1.3 (br, 8H), 0.8 (br, 4H). UV-vis ($H_2O$): $\lambda_{max}$=362 nm; PL ($H_2$): λmax=421 nm. $\epsilon=3.24\times10^4$ $M^{-1}$ $cm^{-1}$ per monomer unit.

Example 15

The absorption spectra of the cationic polymers ($M_{100}P_0^+$, $M_{90}P_{10}^+$, $M_{75}P_{25}^+$, $M_{50}P_{50}^+$, $M_{25}P_{75}^+$, $M_0P_{100}^+$). There is a clear blue shift (from 380 nm for $M_0P_{100}^+$ to 337 nm for $M_{100}P_0^+$) with increasing fraction of meta linkages in the random copolymers. Such a spectral blue shift is expected on the basis of the less effective conjugation across the meta linkage along the polymer main chain. The representative absorption spectra are shown in FIG. 1.

Example 16

Figure 2:
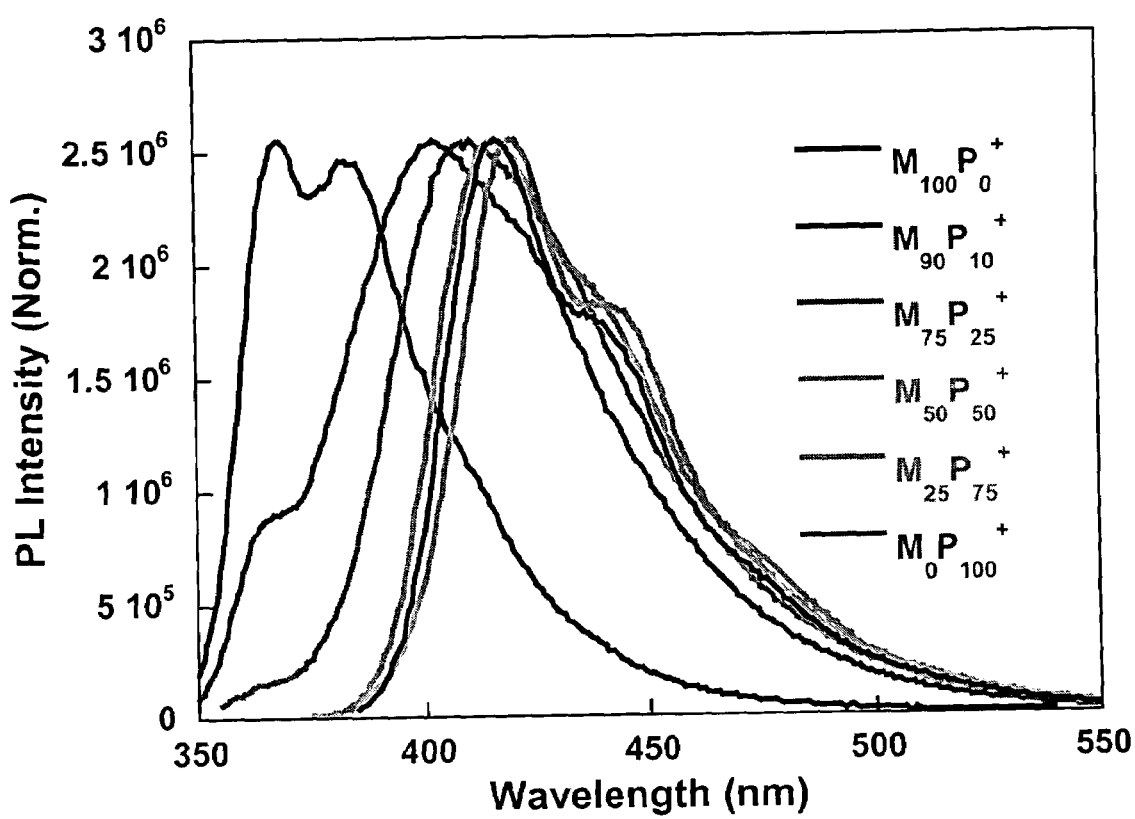
FIG. 2 presents the emission spectra of cationic water-soluble polymers ($M_{100}P_0^+$, $M_{90}P_{10}^+$, $M_{75}P_{25}^+$, $M_{50}P_{50}^+$, $M_{25}P_{75}^+$, $M_0P_{100}^+$) in water.

The emission spectra of the cationic water-soluble polymers ($M_{100}P_0^+$, $M_{90}P_{10}^+$, $M_{75}P_{25}^+$, $M_{50}P_{50}^+$, $M_{25}P_{75}^+$, $M_0P_{100}^+$). There is a red-shift in the emission of the polymers with increasing fraction of para linkages. However, the maximum of the emission saturates more quickly, as compared to the absorption spectra. Efficient intramolecular energy transfer occurs, since introducing 10% para linkage shifts the polymer emission from 369 nm (all meta linkage) to 400 nm. Due to the efficient intramolecular energy transfer, polymers of 50% or higher para linkers have very similar emission spectra. Representative emission spectra are shown in FIG. 2.

Example 17

Figure 3:
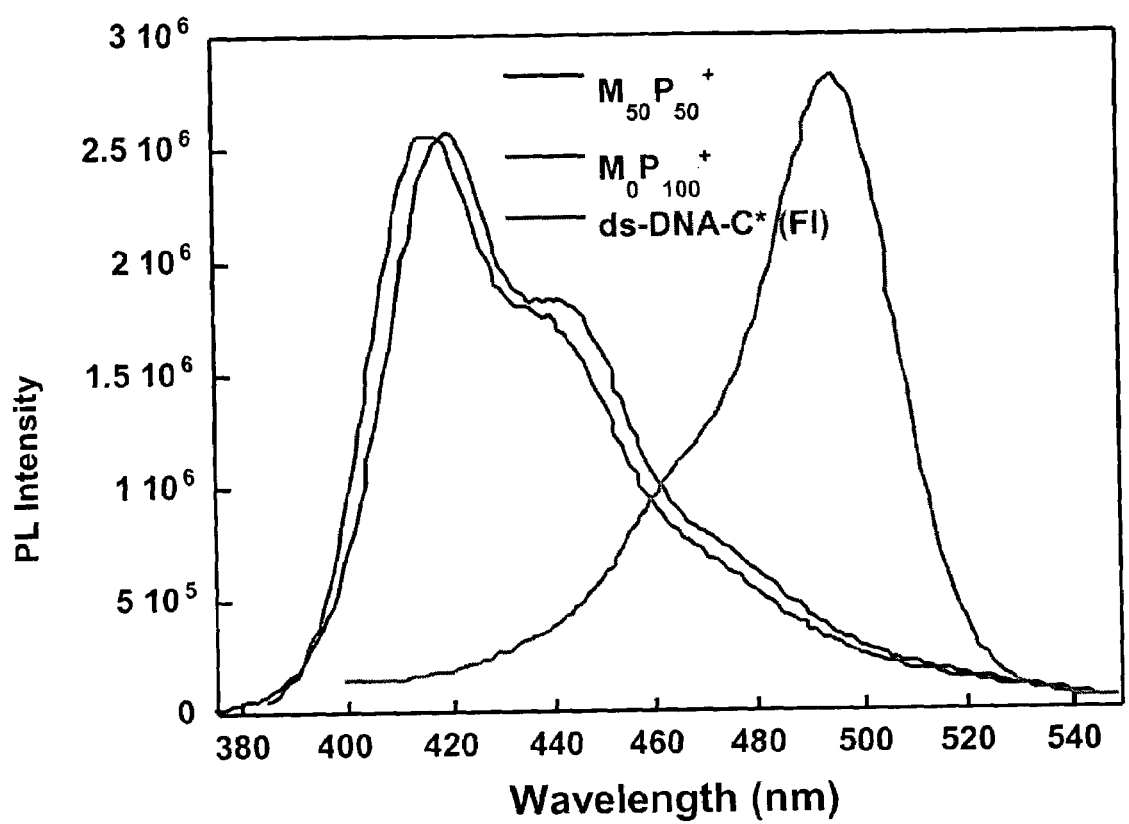
FIG. 3 depicts the emission spectra of $M_{50}P_{50}^+$ and $M_0P_{100}^+$, and the absorption spectrum of ds-DNA-C* (C*=fluorescein) in water. The excitation wavelength is 360 nm for $M_{50}P_{50}^+$, and 380 nm for $M_0P_{100}^+$.

The emission spectra of cationic water-soluble polymers $M_{50}P_{50}^+$ and $M_0P_{100}^+$ and the absorption spectrum of ds-DNA-C* (C*=fluorescein) (shown in FIG. 3). The ds-DNA-C* was prepared by annealing the ss-DNA-C* probe (sequence 5'-C*-ATC TTG ACT ATG TGG GTG CT) at 2° C. below its melting point (59.5° C.) in the presence of an equimolar amount of its complementary 20 base pair (5'-AGC ACC CAC ATA GTC AAG AT) for 20 min. The data show that, despite their different molecular structures, there is nearly identical overlap between the emission of the polymers and the ds-DNA-C* absorption. The optical requirements for Förster energy transfer are equally met for both materials.

Example 18

Figure 4:
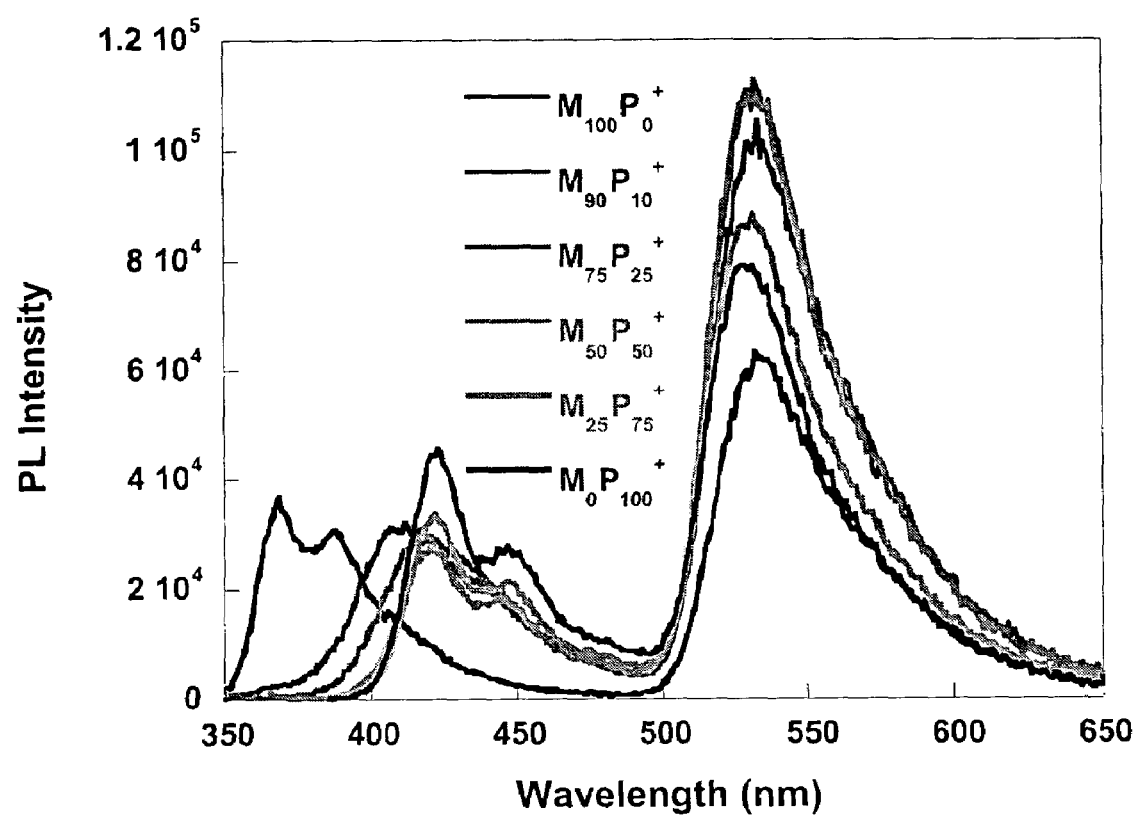
FIG. 4 depicts the emission spectra from solutions containing $M_{100}P_0^+$ (345 nm), $M_{90}P_{10}^+$ (345 nm), $M_{75}P_{25}^+$ (353 nm), $M_{50}P_{50}^+$ (360 nm), $M_{25}P_{75}^+$ (375 nm), $M_0P_{100}^+$ (380 nm) and ds-DNA-C* in 50 mmol phosphate buffer (pH=8.0) ([ds-DNA-C*]=2.0 E-8 M, [polymer repeat unit]=5.0 E-7 M). The excitation wavelength is in parenthesis.
Figure 5:
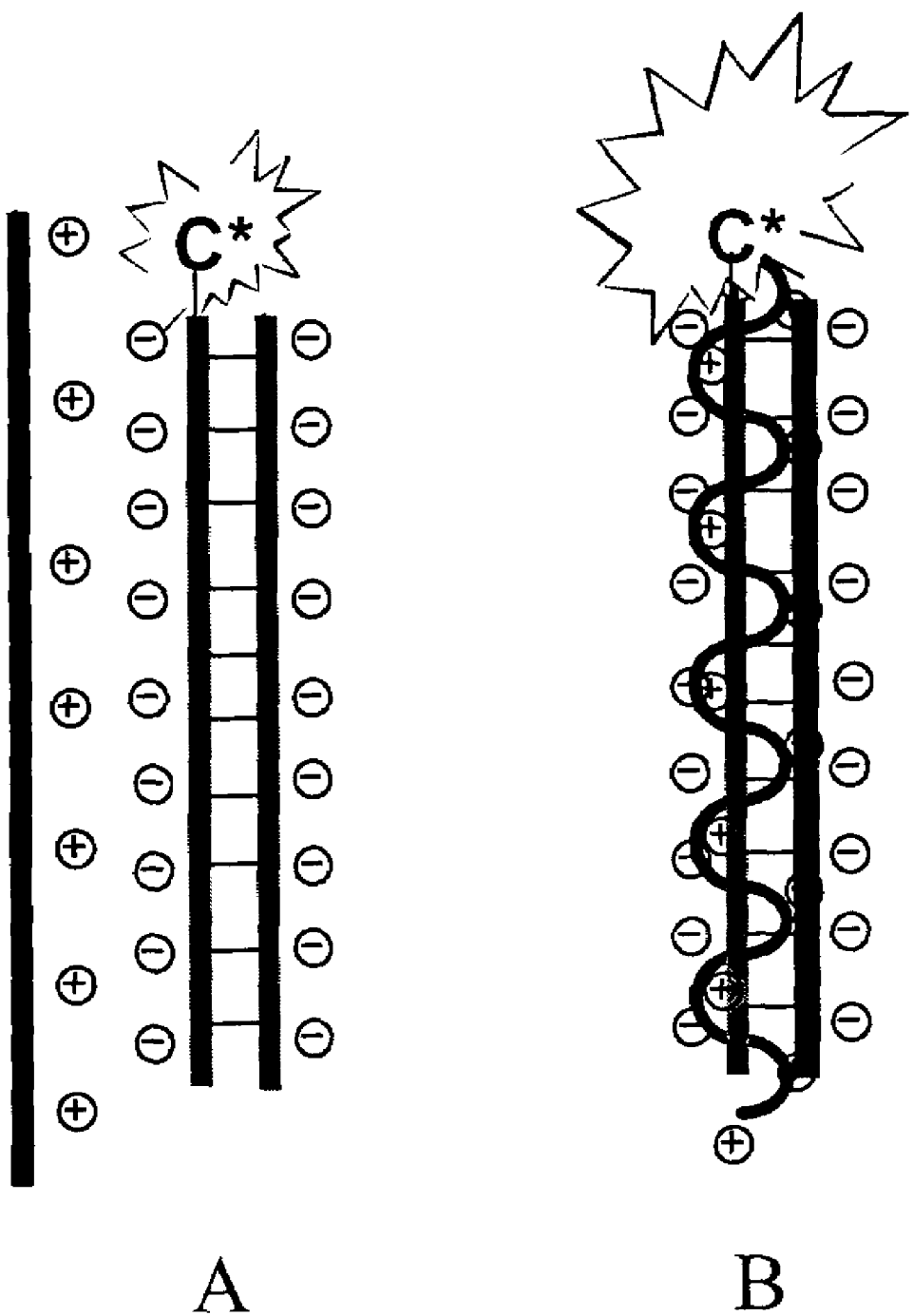
FIG. 5 presents a schematic representation for the interaction of cationic water soluble conjugated polymers with different shape of polymers with ds-DNA-C*.

Comparison of energy transfer between the cationic water-soluble polymers ($M_{100}P_0^+$, $M_{90}P_{10}^+$, $M_{75}P_{25}^+$, $M_{50}P_{50}^+$, $M_{25}P_{75}^+$, $M_0P_{100}^+$) and ds-DNA C*. The ds-DNA-C* was prepared by annealing the ss-DNA-C* probe (sequence 5'-C*-ATC TTG ACT ATG TGG GTG CT) at 2° C. below the melting point (59.5° C.) in the presence of an equimolar amount of its complementary 20 base pair (5'-AGC ACC CAC ATA GTC AAG AT) for 20 minutes. Measurements were carried out in a buffered solution (50 mmol phosphate buffer pH=8.0) and at a fixed ds-DNA-C* concentration (2.0 E-8 M). FIG. 4 shows a direct comparison of the emission of C* upon excitation of the polymers in the presence of ds-DNA-C*. The excitation wavelength is the maximum absorption of each polymer. At a polymer concentration of 5.0 E-7 M in repeat units, the emission from ds-DNA-C* (upon excitation of the polymers) is higher for the random copolymers, as compared to the all para, rigid rod polymer. A schematic illustration of the difference in polymer/ds-DNA-C* complexation is shown in FIG. 5.

Example 19

Figure 6:
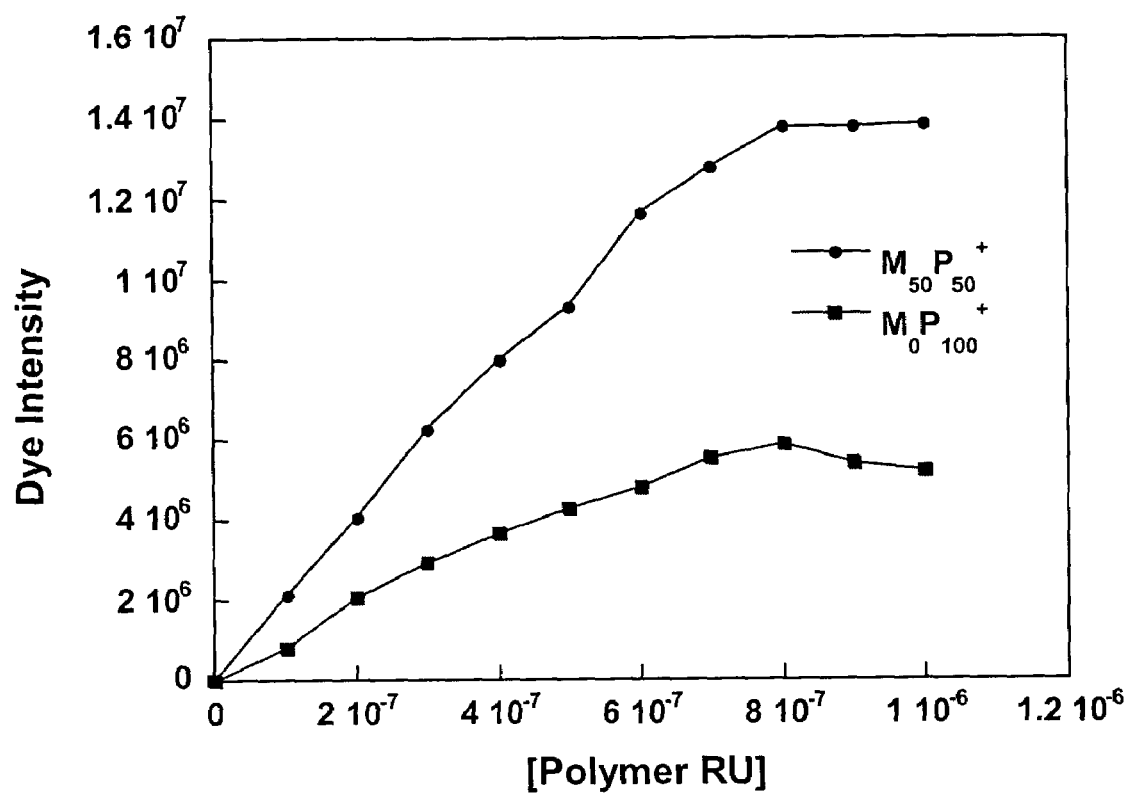
FIG. 6. Comparison of the C* intensity for $M_{50}P_{50}^+$/ds-DNA-C* and $M_0P_{100}^+$/ds-DNA-C* in 50 mmol phosphate buffer (pH=8.0) with polymer concentration varying from 1.0 E-7 M to 1.0 E-6 M at a ds-DNA-C* concentration of 2.0 E-8 M. The excitation wavelength is 363 nm for both $M_{50}P_{50}^+$ and $M_0P_{100}^+$.

FIG. 6 shows a direct comparison of the C* emission against polymer concentration in buffer upon excitation of $M_{50}P_{50}^+$ or $M_0P_{100}^+$. Measurements were carried out in buffer (50 mmol phosphate buffer pH=8.0), at a fixed ds-DNA-C* concentration ([ds-DNA-C*]=2.0 E-8 M), with the polymer concentration varying from 1.0 E-7 M to 1.0 E-6 M. The excitation wavelength for both polymers was chosen at 363 nm, where the optical density for both polymers is nearly identical. Taking into account that an equal number of polymer excitations are generated, the C* emission is twice more intense for $M_{50}P_{50}^+$/ds-DNA-C* than for $M_0P_{100}^+$/ds-DNA-C* at each polymer concentration.

Example 20

Figure 7:
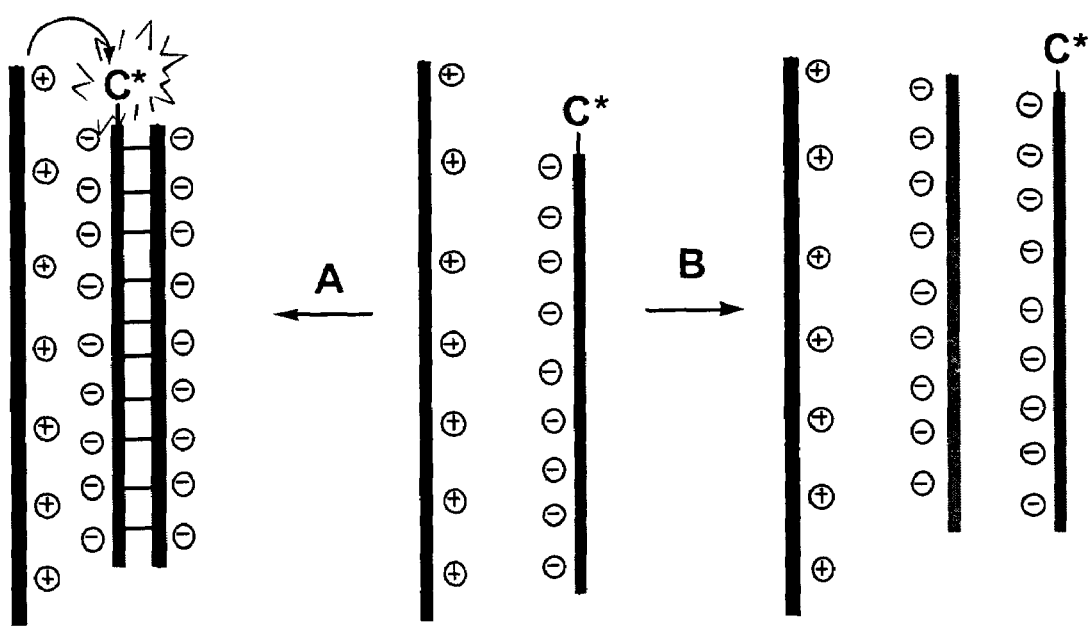
FIG. 7. Schematic illustration of a strand specific DNA assay based on a cationic water-soluble conjugated polymer (in black) in conjunction with a specific ss-DNA-C* optical probe (in red) to detect a complementary ss-DNA sequence (in blue). The non-complementary ss-DNA is shown in green.

A scheme for the use of a cationic water-soluble conjugated polymer with a specific ss-DNA-C* optical probe to detect a complementary ss-DNA sequence is shown in FIG. 7.[2] In a homogeneous assay, one excites the conjugated polymer and compares the emission of the dye (C*) attached to the probe ss-DNA (shown in red) to that of the conjugated polymer (shown in black). The optical properties of the components are chosen so that only the conjugated polyelectrolyte absorbs at the excitation frequency and the absorption of C* overlaps the emission from the conjugated polyelectrolyte. Hybridization of the ss-DNA-C* probe strand to its complementary strand (shown in blue) results in a more efficient FRET ratio (A) than when a non-complementary strand (shown in green) is present in the solution (B).

Example 21

Figure 8:
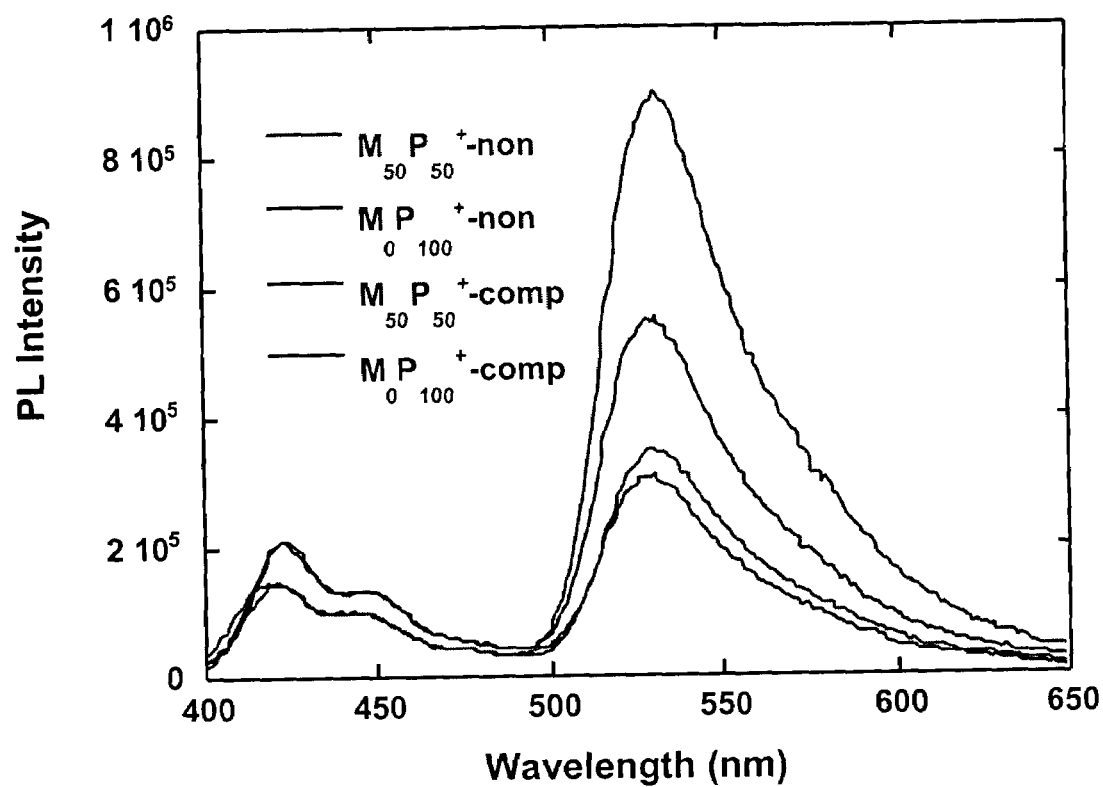
FIG. 8. Emission spectra from solutions containing $M_{50}P_{50}^+$, complimentary ds-DNA-C* and non-complimentary ss-DNA-C*/DNA and $M_0P_{100}^+$, complimentary ds-DNA-C* and non-complimentary ss-DNA-C*/DNA in 50 mmol phosphate buffer (pH=8.0, [ds-DNA-C*]=[ss-DNA-C*]=2.0 E-8 M, [polymer repeat unit]=4.2 E-7 M). The excitation wavelength is 360 nm for $M_{50}P_{50}^+$ and 380 nm for $M_0P_{100}^+$. For each polymer, the polymer emission spectra were normalized for comparison.

Comparison of the emission of C* upon excitation of $M_{50}P_{50}^+$ or $M_0P_{100}^+$ in the presence of (i) ds-DNA-C* and (ii) ss-DNA-C*/non-complementary ss-DNA (FIG. 8). The DNA-C* probe with a specific sequence 5'-C*-ATC TTG ACT ATG TGG GTG CT) was annealed 2° C. below the melting point (59.5° C.) for 20 minutes in the presence of an equimolar amount of its complementary 20 base pair (5'-AGC ACC CAC ATA GTC AAG AT) and in an identical fashion with an non-complementary 20 base ss-DNA (5'-GAC TCA ATG GCG TTA GAC TG). Measurements were carried out in buffer (50 mmol phosphate buffer pH=8.0) with [ds-DNA-C*]=[ss-DNA-C*]=2.0E-8 M.

At a polymer repeat unit concentration of 4.2E-7 M, one observes two important differences. First, the ds-DNA-C* emission is more intense for the $M_{50}P_{50}^+$ than $M_0P_{100}^+$; Second, the C* emission intensity ratio for ds-DNA-C*/(ss- DNA-C*+ss-DNA) is larger for $M_{50}P_{50}^+$. Therefore, the use $M_{50}P_{50}^+$ yields more intense signal and lower background emission than $M_0P_{100}^+$, which provides a DNA assay that is more discriminating.

Example 22

Figure 9:
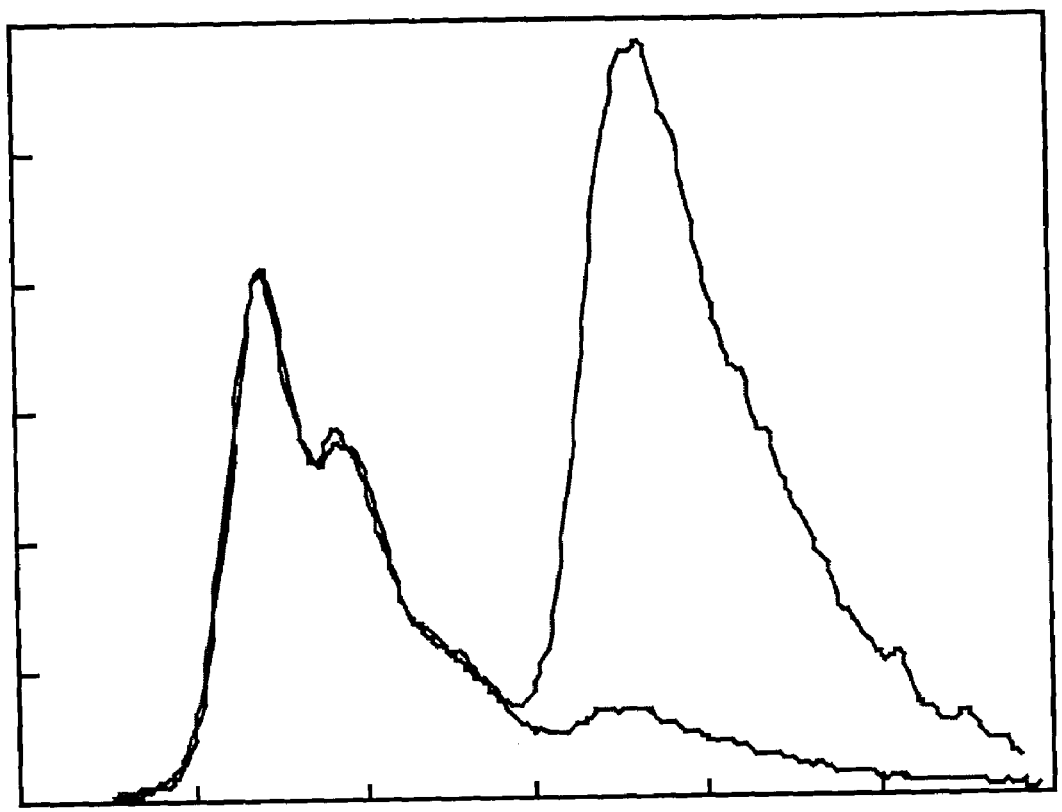
FIG. 9. Emission spectra from solutions containing $M_{50}P_{50}^+$, complimentary ds-PNA-C*/DNA (PNA=peptide nucleic acid) and non-complimentary ss-PNA-C*/DNA in 50 mmol phosphate buffer (pH=6.0, [ds-PNA-C*/DNA]= [ss-PNA-C*/DNA]=2.0 E-8 M, [$M_{50}P_{50}^+$ repeat unit]=2.5 E-7 M). The excitation wavelength is 360 nm. The spectra were normalized with respect to the polymer emission.

An example of using $M_{50}P_{50}^+$ as an energy transfer donor for a strand specific DNA assay which takes advantage of chromophore (C*) labeled peptide nucleic acid (PNA) probe strands. In PNAs, the negatively charged phosphate linkages in DNA are replaced by peptomimetic amide linkages. Consequently, non-specific electrostatic interactions between cationic water-soluble polymers and the PNA-C* probe will be greatly reduced, as compared to the same situation where ss-DNA-C* is used as a probe.[1] Similar to the method described in Example 17 for annealing with DNA, the PNA-C* probe ([PNA-C*]=2.0E-8 M, sequence 5'-C*-CAG TCC AGT GAT ACG-3') was annealed 2° C. below its melting point (72° C.) in the presence of an equimolar amount of its complementary 15 base pair ss-DNA (5'-CGT ATC ACT GGA CTG-3') and in an identical fashion with a non-complementary 15 base ss-DNA (5'-ACT GAC GAT AGA CTG-3'). Measurements were carried out in buffer (50 mmol phosphate buffer pH=6.0) and at a fixed PNA-C* concentration of 2.0E-8M. FIG. 9 shows representative data for this type of assay using the copolymer of $M_{50}P_{50}^+$.

Example 23

UV-vis and fluorescence spectra for a range of compositions are summarized in Table 3. There is a progressive blue shift in absorption with increasing meta content, consistent with the more effective electronic delocalization across para linkages. The $\epsilon$ values are lowest for polymers with intermediate compositions because the random distribution of conjugated segments results in broader absorption bands.

TABLE 3

Optical properties of the polymers.

| $M_nP_m^+$ | $\lambda_{max, abs}$ | $\lambda_{max, em}$ | $\epsilon^a$ | $\Phi_{buffer}^b$ |
|---|---|---|---|---|
| $M_{100}P_0^+$ | 335 | 369 | 37 | 0.51 |
| $M_{90}P_{10}^+$ | 337 | 403 | 32 | 0.57 |
| $M_{75}P_{25}^+$ | 347 | 410 | 30 | 0.50 |
| $M_{50}P_{50}^+$ | 361 | 421 | 32 | 0.44 |
| $M_{25}P_{75}^+$ | 376 | 417 | 42 | 0.42 |
| $M_0P_{100}^+$ | 384 | 417 | 46 | 0.42 |

$^a$unit: $10^3$ Lcm$^{-1}$mol$^{-1}$
$^b$50 mmol phosphate buffer, quinine bisulfite as the standard FIG. 2 shows the fluorescence spectra in water as a function of polymer composition. Increasing the para content past the 50:50 ratio does not perturb the emission maxima. Fast energy transfer, either by intra- or interchain mechanisms, localizes excitations on the longest conjugation segments within the lifetime of the excited state.[18] Table 3 shows that there is little variation in the fluorescence quantum yields ($\phi$ in Table 3).

Equation 1 describes how the FRET rate changes as a function of the donor-acceptor distance (r), the orientation factor ($\kappa$), and the overlap integral (J).

$$k_{t(r)} \propto \frac{1}{r^6} \cdot k^2 \cdot J(\lambda) \quad (1)$$

$$J(\lambda) = \int_0^\infty F_D(\lambda)\varepsilon_A(\lambda)\lambda^4 d\lambda$$

Since $M_{50}P_{50}^+$ and $M_0P_{100}^+$ have similar emission frequencies, the value of J using a common acceptor dye should be nearly identical between the two polymers. The fluorescence lifetimes of the two polymers are similar (400 ±50 ps). Therefore, differences in FRET efficiencies to a common acceptor chromophore can extract information relevant to the average polymer/acceptor chromophore distance and the orientation of transition moments.

To examine the effect of polymer structure on the interactions with a biological substrate, we examined FRET from $M_{50}P_{50}^+$ or $M_0P_{100}^+$ to a double stranded DNA containing fluorescein (C*) at the 5' position (dsDNA-C*). FIG. 6 shows the C* emission intensity as a function of polymer concentration, upon excitation of $M_{50}P_{50}^+$ or $M_0P_{100}^+$ at 363 nm. This wavelength was chosen because there is no significant C* absorption and the two polymers have similar $\epsilon$ values. Excitation thus leads to a similar number of polymer-based excited states. We also confirmed that the value of $\phi$ for C* is the same in the two sets of solutions. The data in FIG. 6 show more efficient FRET from $M_{50}P_{50}^+$, consistent with a shorter distance to dsDNA-C*, and/or with more variable orientation of the transition moments (improved $\kappa$).

Figure 10:
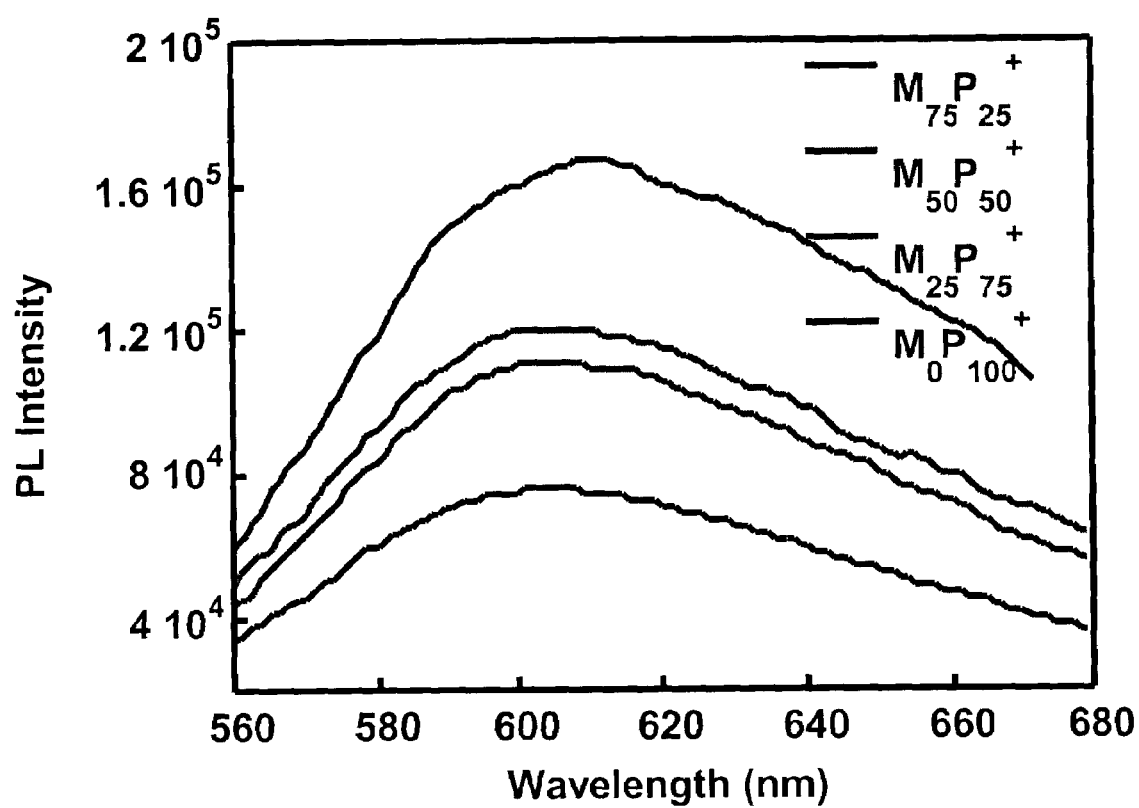
FIG. 10. Comparison of the intensity of EB (EB=Ethidium bromide) emission for polymer/ds-DNA/EB in 50 mmol phosphate buffer (pH=7.4) with [ds-DNA]=1.0 E-8 M, [Polymer RU]=2.0 E-7 M, [EB]=1.1 E-6 M. Emission intensity was normalized relative to the $\epsilon$ value at the excitation wavelength.

A second set of experiments involved FRET from the CCPs to ds-DNA with intercalated ethidium bromide (EB).[19,20] EB emission occurs only from FRET to the intercalated moieties, upon excitation of the CCPs. FIG. 10 shows more efficient transfer in the series $M_0P_{100}^+ \rightarrow M_{25}P_{75}^+ \rightarrow M_{50}P_{50}^+ \rightarrow M_{75}P_{25}^+$ ($M_{10}P_0^+$ was not tested because its emission spectrum does not overlap significantly the absorption spectra of EB ($\lambda_{max,abs}$=530 nm)). A clear improvement in FRET therefore takes place with increased meta contents in the polymer.

Although the invention has been described in some detail with reference to the preferred embodiments, those of skill in the art will realize, in light of the teachings herein, that certain changes and modifications can be made without departing from the spirit and scope of the invention. Accordingly, the invention is limited only by the claims.

REFERENCES

[1] Gaylord, B. S.; Heeger, A. J.; Bazan, G. C. DNA detection using water-soluble conjugated polymers and peptide nucleic acid probes. Proc. Natl. Acad. Sci. USA. 2002, 99, 10954.

[2] Gaylord, B. S.; Heeger, A. J.; Bazan, G. C. DNA hybridization detection with water-soluble conjugated polymers and chromophores labeled single stranded DNA. J. Am. Chem. Soc. 2003,

[3] Bronich, T. K.; Nguyen, H. K.; Eisenberg, A.; Kabanov, A. V. Recognition of DNA topology in reactions between plasmid DNA and cationic copolymers. J. Am. Chem. Soc. 2000, 122, 8339.

[4] Principles of fluorescence spectroscopy. (Lakowicz, J R. Ed.) Kluwer academic, Plenum Publishers, New York, 1999).

[5] Chen, L.; McBranch, D. W.; Wang, H. L.; Helgeson, R.; Wudl, F.; Whitten, D. G. Proc. Natl. Acad. Sci. U.S.A. 2000, 96, 12287.

[6] McQuade, D. T.; Pullen. A. E.; Swager, T. M. Chem. Rev. 2000, 100, 2537.
[7] Pinto, M. R.; Schanze, K. S. Synthesis-Stuttgart. 2002, 9, 1293.
[8] Baur, J. W.; Kim, S. H.; Balanda, P. B.; Reynolds, J. R.; Rubner, M. F. Thin-Film light-emitting devices based on sequentially adsorbed multilayers of water-soluble poly (p-phenylene)s. Adv. Mater. 1998, 10, 1452.
[9] Nielsen, P. E.; Egholm, M. Peptide Nucleic Acids: Protocols and Applications. Horizon Scientific Press, Portland, 1999.
[10] K. Nagai, I. W. Mattay, RNA-Protein Interactions. Frontiers in Molecular Biology Series (Oxford University Press, Oxford, UK, 1994).
[11] G. Varani, Acc. Chem. Res. 30, 189 (1997).
[12] Y. N. Vaishnav, F. Wong-Staal, Ann. Rev. Biochem. 60, 577 (1991).
[13] C. Jain. J. G. Belasco, Methods Enzymol. 318, 309 (2000).
[14] B. A. Sullenger, E. Gilboa, Nature 418, 252 (2002).
[15] E. V. Pilipenko et al., Genes Dev. 14, 2028 (2000).
[16] Portela, P. Digard, J. Gen. Virol. 83, 723 (2001).
[17] G. T. Hermanson, Bioconjugate Techniques, Academic Press, San Diego, 1996.
[18] Miao, Y. J.; Herkstroeter, W. G.; Sun, B. J.; Wong-Foy, A. G.; Bazan, G. C. J. Am. Chem. Soc. 1995, 117, 11407.
[19] LePecg, J. B.; Paoletti, C. J. Mol. Biol. 1967, 27, 87.
[20] Morgan, A. R.; Pulleyblank, D. E. Biochem. Biophys. Res. Commun. 1974, 61, 346.

What is claimed is:

1. A conformationally flexible cationic conjugated polymer comprising at least one angled linker having bonds to its two adjacent polymeric units which form an angle of less than about 155° with respect to one another and comprising multiple cationic groups in said polymer.

2. The polymer of claim 1, wherein the angle is less than about 145°.

3. The polymer of claim 1, wherein the angle is less than about 135°.

4. The polymer of claim 1, wherein the angle is less than about 125°.

5. The polymer of claim 1, wherein the angle is about 45° or more.

6. The polymer of claim 1, wherein the angle is about 60° or more.

7. The polymer of claim 1, wherein the monomeric unit has an optionally substituted structure selected from the group consisting of 1,2-benzene, 1,3-benzene, 1,2-naphthalene, 1,3-naphthalene, 1,6-naphthalene, 1,7-naphthalene, 1,8-naphthalene, 1,2-anthracene, 1,3-anthracene, 1,6-anthracene, 1,7-anthracene, 1,8-anthracene, and 1,9-anthracene, 2,3-biphenyl, 2,4-biphenyl, 2,6-biphenyl, 3,3'-biphenyl, 3,4-biphenyl, 3,5-biphenyl, 2,2'-biphenyl, 2,3'-biphenyl, 2,4'-biphenyl, and 3,4'-biphenyl, and wherein said monomeric unit is optionally substituted with one or more heteroatoms.

8. The polymer of claim 1, wherein the polymer is soluble in a predominantly aqueous medium.

9. The polymer of claim 1, wherein the polymer is soluble in water.

10. The polymer of claim 1, wherein the polymer comprises at least 1 mole percent of said monomeric unit.

11. The polymer of claim 1, wherein the monomeric unit introduces a torsional twist into the polymer.

12. The polymer of claim 1, wherein the polymer is a copolymer.

13. The polymer of claim 1, wherein the polymer is a block copolymer.

14. The polymer of claim 12, wherein the monomeric unit is incorporated randomly.

15. The polymer of claim 12, wherein the monomeric unit is incorporated periodically.

16. The polymer of claim 12, wherein the monomeric unit is incorporated in a block.

17. The polymer of claim 1, wherein said polymer has the structure:

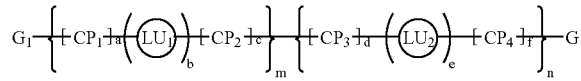

wherein:
CP1, CP2, CP3 and CP4 are optionally substituted conjugated polymer segments or oligomeric structures, and may be the same or different from one another;

LU1 and LU2 are angled linkers forming bond angles to two adjacent polymeric units of less than about 155°, and can be mono- or polycyclic optionally substituted aryl groups having 5 to 20 atoms;

CP1, CP2, CP3, CP4, LU1 and LU2 are each optionally substituted at one or more positions with one or more groups selected from —R1-A, —R2-B, —R3-C and —R4-D, and may be attached through bridging functional groups -E- and —F—, with the proviso that the polymer as a whole must be substituted with a plurality of cationic groups;

R1, R2, R3 and R4 are independently selected from alkyl, alkenyl, alkoxy, alkynyl, and aryl, alkylaryl, arylalkyl, and polyalkylene oxide, each optionally substituted, and which may contain one or more heteroatoms, or may be not present;

A, B, C and D are independently selected from H, —SiR'R''R''', —N$^+$R'R''R''', a guanidinium group, histidine, a polyamine, a pyridinium group, and a sulfonium group;

R', R'' and R''' are independently selected from the group consisting of hydrogen, C1–12 alkyl, C1–12 alkoxy and C3–10 cycloalkyl;

E and F are independently selected from not present, —O—, —S—, —C(O)—, —C(O)O—, —C(R)(R')—, —N(R')—, and —Si(R')(R'');

m and n are independently 0 to about 10,000, wherein m+n>1;

b and e are independently 0 to about 250, wherein b+e>1;

a, c, d and f are independently 0 to about 250; and

G and G1 are capping units and may be the same or different, and are selected from activated units that allow further chemical reaction to extend the polymer chain, and nonactivated termination units.

* * * * *